United States Patent
Murakami et al.

(10) Patent No.: US 8,014,128 B2
(45) Date of Patent: Sep. 6, 2011

(54) METHOD FOR FORMING OXIDE FILM ON METAL SURFACE USING IONIC LIQUID, ELECTROLYTIC CAPACITOR AND ELECTROLYTE THEREOF

(75) Inventors: Mutsuaki Murakami, Osaka (JP); Masamitsu Tachibana, Osaka (JP); Hiroyuki Furutani, Osaka (JP); Hideo Yamagishi, Kyoto (JP)

(73) Assignee: Kaneka Corporation, Osaka (JP)

( * ) Notice: Subject to any disclaimer, the term of this patent is extended or adjusted under 35 U.S.C. 154(b) by 197 days.

(21) Appl. No.: 10/565,716

(22) PCT Filed: Jul. 26, 2004

(86) PCT No.: PCT/JP2004/010996
§ 371 (c)(1),
(2), (4) Date: Jan. 25, 2006

(87) PCT Pub. No.: WO2005/012599
PCT Pub. Date: Feb. 10, 2005

(65) Prior Publication Data
US 2006/0181835 A1    Aug. 17, 2006

(30) Foreign Application Priority Data

| Jul. 31, 2003 | (JP) | 2003-204299 |
| Sep. 3, 2003 | (JP) | 2003-310856 |
| Mar. 17, 2004 | (JP) | 2004-075625 |
| Mar. 22, 2004 | (JP) | 2004-082827 |
| Mar. 22, 2004 | (JP) | 2004-082838 |

(51) Int. Cl.
*H01G 9/02* (2006.01)

(52) U.S. Cl. ........ 361/525; 361/516; 361/519; 361/523; 361/528; 361/529

(58) Field of Classification Search .......... 361/523–541, 361/516–519, 508–512; 29/25.01, 25.03; 252/510, 511
See application file for complete search history.

(56) References Cited

U.S. PATENT DOCUMENTS
5,473,503 A    12/1995 Sakata et al.
(Continued)

FOREIGN PATENT DOCUMENTS
JP    5-13278 A    1/1993
(Continued)

OTHER PUBLICATIONS

International Search Report from Corresponding International Application No. PCT/JP2004/010996, dated Nov. 22, 2004, 1 page.

(Continued)

*Primary Examiner* — Nguyen T Ha
(74) *Attorney, Agent, or Firm* — Hamre, Schumann, Mueller & Larson, P.C.

(57) ABSTRACT

The present invention provides means for forming an oxide film on a metal surface, means for repairing a defect of an oxide film, a high-performance electrolytic capacitor using the means, and an electrolyte of the capacitor. Namely, the prevent invention provides a method for easily forming an oxide film on the surface of a metal or an alloy thereof by anodization using a solution containing an ionic liquid. In an application of this method, an electrolytic capacitor having means for repairing a defect of an oxide film can be formed by a method using, as an electrolyte, an ionic liquid, a solution containing an ionic liquid and a salt, or a solution containing an ionic liquid and a conductive polymer or a TCNQ salt, and a valve metal or an alloy thereof as a metal.

10 Claims, 4 Drawing Sheets

U.S. PATENT DOCUMENTS

| | | | |
|---|---|---|---|
| 5,838,531 | A | 11/1998 | Saito et al. |
| 6,239,965 | B1 * | 5/2001 | Shiraishi et al. ............... 361/511 |
| 6,310,765 | B1 | 10/2001 | Tanahashi et al. |
| 6,352,564 | B1 | 3/2002 | Araki et al. |
| 6,409,905 | B1 | 6/2002 | Melody et al. |
| 6,674,635 | B1 | 1/2004 | Fife et al. |
| 6,687,118 | B1 | 2/2004 | O'Phelan et al. |
| 6,783,703 | B2 * | 8/2004 | Monden et al. ............... 252/511 |
| 6,807,049 | B2 | 10/2004 | Konuma et al. |
| 6,882,522 | B2 | 4/2005 | Naito et al. |
| 6,989,289 | B1 * | 1/2006 | Shiraishi et al. ................ 438/99 |
| 7,060,205 | B2 | 6/2006 | Monden et al. |
| 7,099,146 | B2 * | 8/2006 | Kobayashi et al. ........... 361/523 |
| 2004/0054041 | A1 * | 3/2004 | Schmidt .......................... 524/99 |
| 2004/0095708 | A1 | 5/2004 | Takeda et al. |
| 2007/0263341 | A1 * | 11/2007 | Tsukada et al. ............... 361/503 |

FOREIGN PATENT DOCUMENTS

| | | | |
|---|---|---|---|
| JP | 5-101983 | A | 4/1993 |
| JP | 6-322588 | A | 11/1994 |
| JP | 10-168028 | | 6/1998 |
| JP | 11-283874 | | 10/1999 |
| JP | 2002-198263 | A | 7/2002 |
| JP | 2003-22938 | A | 1/2003 |
| JP | 2003-142346 | A | 5/2003 |
| JP | 02003243028 | A * | 8/2003 |
| WO | 02/063073 | | 8/2002 |

OTHER PUBLICATIONS

International Preliminary Report on Patentability (Chapter I of the Patent Cooperation Treaty) from Corresponding International Application No. PCT/JP2004/010996, dated May 22, 2006, 5 pages.

Nagata, Izaya, "Electrolyte-Cathode Aluminum Electrolytic Capacitor (revised and extended edition of Aluminum Dry-Type Electrolytic Capacitor)," *Japan Capacitor Industrial Co., Ltd.*, Feb. 24, 1997, Second Edition, First Copy, Published, 8 pages.

* cited by examiner

METHOD FOR FORMING OXIDE FILM ON METAL SURFACE USING IONIC LIQUID, ELECTROLYTIC CAPACITOR AND ELECTROLYTE THEREOF

RELATED APPLICATIONS

This application is a nationalization of PCT application PCT/JP2004/010996 filed on Jul. 26, 2004, claiming priority to Japanese Application No. 2003-204299 filed on Jul. 31, 2003, No. 2003-310856 filed on Sep. 3, 2003, No. 2004-075625 filed on Mar. 17, 2004, No. 2004-082838 filed on Mar. 22, 2004, and No. 2004-082827 filed on Mar. 22, 2004.

TECHNICAL FIELD

The present invention relates to a method for forming an oxide film on a metal surface by anodization or a method for repairing a metal oxide film, an electrolytic capacitor using the principle of the formation or repair of an oxide film by the method, and an electrolyte of the capacitor.

BACKGROUND ART

An anodization method is a method for forming an oxide film on the surface of a metal used as an anode in an acid solution or a neutral solution. This method is frequently used for forming oxide films on valve metals such as, aluminum and tantalum. For example, with aluminum, porous thick oxide films are formed in an acid solution of sulfuric acid, oxalic acid, phosphoric acid, or the like and barrier-type dense thin films are formed in a neutral solution of a borate, a phosphate, an adipate, or the like. Porous aluminum oxide films are used for corrosion prevention, friction prevention, coloring decoration, and the like, and barrier-type films are widely used as dielectrics of electrolytic capacitors.

An electrolytic capacitor generally includes an anode composed of a valve metal such as aluminum or tantalum, a dielectric composed of an oxide film formed on the surface of the anode, and a cathode formed to hold an electrolyte between the cathode and the dielectric. In the electrolytic capacitor, the driving electrolyte has two important functions. One of the two is the function as the actual cathode. Namely, the electrolyte functions to extract a capacitance from the dielectric formed on the anode and is required to have high electric conductivity, i.e., high electron conductivity. The other is the function to protect and repair a very thin oxide film, i.e., the chemical function to form a new oxide in a defect of an aluminum or tantalum oxide film on the basis of the ion conductivity possessed by the electrolyte. Namely, the anodization is used for forming a dielectric oxide film in an electrolytic capacitor and for repairing a defect of an oxide film. Therefore, the electrolyte of the electrolytic capacitor is required to have an anodizing ability.

As the electrolyte of the electrolytic capacitor, an organic solvent such as ethylene glycol or γ-butyrolactone containing an organic acid, an inorganic acid, or a salt thereof is generally used. Specific examples of an organic acid, an inorganic acid, or a salt thereof added to the solvent include phosphoric acid, formic acid, acetic acid, ammonium adipate, ammonium succinate, tertiary amines, and quaternary ammonium salts. Such a composite electrolytic system is used for forming an electrolyte having excellent ion conductivity (Patent Document 1).

Although the conductivity of such a liquid electrolyte is improved by adding the above-described additive, the conductivity is only about $10^{-3}$ S/cm, which is unsatisfactory for realizing a low-impedance capacitor. Also, the liquid electrolyte causes a dry-up phenomenon due to evaporation of the solvent used, and both the anodizing property and conductivity are lost by the dry-up. Therefore, the electrolyte is unsatisfactory in the long-term life and heat resistance.

In order to improve these properties, use of a molten salt as an electrolyte for a capacitor has been investigated. For example, an investigation has been conducted for forming an electrolyte for a capacitor by melting or melting and then solidifying an electrolytic salt having a nitrogen-containing heterocyclic cation having a conjugated double bond or a nitrogen-containing heterocyclic ring containing a conjugated double bond without using a solvent (Patent Document 1).

Also, an investigation has been conducted for forming a capacitor including an electrolyte for an electrolytic capacitor interposed singly or together with a separator between an anode foil and a cathode, the electrolyte being prepared by melting a mixture of a carboxylate and a carboxylic acid without using a solvent (Patent Document 2). However, these electrolytes are solid at room temperature and thus have the very low anodizing ability and low conductivity. Therefore, the electrolytes have been not yet put into practical applications.

On the other hand, solid capacitors not containing a solvent have been recently developed. Specifically, these capacitors each include, as an electrolyte, a conductive polymer, such as polypyrrole, polyaniline, or a polythiophene derivative. Since these conductive polymers have extremely higher electric conductivity (electron conductivity) than that of the above-described conventional electrolytic solutions each containing an electrolyte and a solvent, the internal impedance of a capacitor using such a conductive polymer as an electrolyte can be decreased. In particular, when these conductive polymer capacitors are used for high-frequency circuits, excellent properties are exhibited. Therefore, such conductive polymer capacitors are establishing an important position in the electrolytic capacitor market.

However, conductive polymers basically do not have ion conductivity, and thus conductive polymer capacitors are far inferior to conventional capacitors each including an electrolytic solution in the anodizing function to repair oxide films of electrolytic capacitors. It is generally said that in a conductive polymer capacitor, a conductive polymer present on the dielectric surface of a damaged portion is insulated by the de-doping reaction of the conductive polymer due to the Joule heat generated in damage to a dielectric film, thereby preventing the breakage of the dielectric film. Such a mechanism is fundamentally different in principle from a mechanism occurring in the function to repair an oxide film of a conventional capacitor using an electrolytic solution (Non-patent Document 2).

Consequently, the conductive polymer capacitors are disadvantageous in that capacitors with a high withstand voltage cannot be formed. Specifically, under present conditions, when aluminum is used for an anode, a conductive polymer capacitor having a withstand voltage up to only about 16 V can be produced, for example, with a formation voltage of 70 V, and when tantalum is used, a conductive polymer capacitor having a withstand voltage up to only about 12 V can be produced, for example, with a formation voltage of 34 V. The term "formation voltage of 70 V" means that in forming a dielectric oxide film on a valve metal surface, the DC voltage applied to the valve metal, i.e., the formation voltage, is 70 V. Of course, the withstand voltage can be basically increased by increasing the formation voltage. In this case, however, the capacitance of a capacitor decreases as the formation voltage increases, and the withstand voltage does not increase in proportion to increases in the formation voltage. Therefore, this is not said to be a preferred method.

As an attempt to improve the withstand voltage characteristic of a conductive polymer capacitor, an electrolytic capacitor is disclosed, in which an electrolyte including a conductive polymer and an organic acid onium salt is used (Patent Document 3). However, it is assumed that the organic acid onium salt is basically a solid salt. Therefore, in order to improve the withstand voltage, the ratio between the conductive polymer (A) and the organic acid onium salt (B) is thought to be preferably in a range of (A):(B)=1:0.1 to 5 and more preferably in a range of (A):(B)=1:0.2 to 2. However, at a ratio in this range, the withstand voltage is certainly improved, but the conductivity characteristic degrades, undesirably resulting in the deterioration in the impedance characteristic of the capacitor. Apart from the above-described technique relating to electrolytic capacitors, a molten salt in a liquid state at room temperature have been developed and attracted attention. The molten salt is referred to as an "ionic liquid", includes a combination of a quaternary salt cation, such as imidazolium or pyridinium, and an appropriate anion ($Br^-$, $AlCl^-$, $BF_4^-$, or $PF_6^-$), and frequently contains a halogen. The ionic liquid has the properties such as nonvolatility, noninflammability, chemical stability, high ion conductivity, and the like, and attracts attention as a reusable green solvent used for various syntheses and chemical reactions such as catalytic reaction. However, there has been no example of investigation of the ionic liquid from the viewpoint of the anodizing property, i.e., from the viewpoint of the formation of an oxide film on a valve metal surface or the repair of an oxide film.

Patent Document 1: Japanese Unexamined Patent Application Publication No. 5-13278

Patent Document 2: Japanese Unexamined Patent Application Publication No. 5-101983

Patent Document 3: Japanese Unexamined Patent Application Publication No. 2003-22938

Non-patent Document 1: Denkai Chikudenki Hyoron (Electrolytic Condenser Review), Vol. 53, No. 1, p. 101 (2002)

Non-patent Document 2: Denkai Chikudenki Hyoron (Electrolytic Condenser Review), Vol. 53, No. 1, p. 95 (2002)

DISCLOSURE OF INVENTION

Considering the above-described situation, the inventor of the present invention has found that an ionic liquid causing no dry up due to evaporation has an excellent oxidation property, leading to the achievement of the present invention. Namely, the present invention relates to a method for easily forming an oxide film on a metal surface by anodization in the presence of an ionic liquid or a method for repairing a previously formed metal oxide film, and an electrolytic capacitor in which the dielectric forming and repairing ability is significantly improved by utilizing the oxide film forming ability of the method. Furthermore, the present invention can realize the excellent electron conductivity and oxide film repairing ability by combining the ionic liquid with an electrolyte for a solid electrolytic capacitor, such as a conductive polymer electrolyte or a TCNQ salt electrolyte, and can thus form an electrolytic capacitor with a low impedance and a high withstand voltage.

The present invention includes the following forms:

1. A method for forming an oxide film on a metal surface, in which anodization is performed in the presence of an ionic liquid.

2. The method for forming an oxide film on a metal surface described above in 1, in which a defect of an oxide film previously formed on a metal surface is repaired by anodization in the presence of an ionic liquid.

3. The method for forming an oxide film on a metal surface by anodization described above in 1 and 2, in which the metal is at least one selected from aluminum and/or alloys thereof, tantalum and/or alloys thereof, and niobium and/or alloys thereof.

4. The method for forming an oxide film on a metal surface described above in 1 to 3, in which an anion component of the ionic liquid is an atomic group containing fluorine.

5. The method for forming an oxide film on a metal surface described above in 1 to 3, in which an anion component of the ionic liquid is an atomic group containing a sulfonic acid anion ($—SO_3^-$).

6. The method for forming an oxide film on a metal surface by anodization described above in 1 to 3, in which an anion component of the ionic liquid is an atomic group containing a carboxylate anion ($—COO^-$).

7. The method for forming an oxide film on a metal surface described above in 1 to 6, in which a cation component of the ionic liquid is at least one selected from imidazolium derivatives, ammonium derivatives, and pyridinium derivatives.

8. The method for forming an oxide film on a metal surface by anodization described above in 1 to 7, in which a solution containing the ionic liquid and at least one selected from ammonium salts, amine salts, quaternary ammonium salts, tertiary amines, and organic acids is used.

9. An electrolytic capacitor including means for the method described above in 1 to 8, for repairing an oxide film.

10. An electrolytic capacitor including a solution containing at least one ionic liquid, the solution being used as an electrolyte serving as means for repairing an oxide film.

11. The electrolytic capacitor described above in 10, in which the solution further contains a conductive polymer.

12. The electrolytic capacitor described above in 11, in which the conductive polymer is at least one selected from polypyrrole, polyaniline, polythiophene, and derivatives thereof.

13. The electrolytic capacitor described above in 11 and 12, in which the weight ratio (ionic liquid/conductive polymer) of the ionic liquid to the conductive polymer is in a range of 1/10,000 to less than 1/10.

14. The electrolytic capacitor described above in 10 to 13, in which the solution further contains a TCNQ salt.

15. The electrolytic capacitor described above in 14, in which the TCNQ salt is a salt containing a donor composed of a nitrogen-containing heterocyclic compound substituted by an alkyl at the N position and an acceptor composed of TCNQ.

16. The electrolytic capacitor described above in 11 to 15, in which an anion component of the ionic liquid is an atomic group containing at least fluorine.

17. The electrolytic capacitor described above in 10 to 15, in which an anion component of the ionic liquid is an atomic group containing at least a sulfonic acid anion ($—SO_3^-$), 18. The electrolytic capacitor described above in 10 to 15, in which an anion component of the ionic liquid is an atomic group containing at least a carboxylate anion ($—COO^-$)

19. The electrolytic capacitor described above in 14 to 18, in which the weight ratio (ionic liquid/TCNQ salt) of the ionic liquid to the TCNQ salt is in a range of 1/10,000 to less than 1/2.

20. The electrolytic capacitor described above in 10 to 19, in which a cation component of the ionic liquid is an imidazolium derivative, an ammonium derivative, or a pyridinium derivative.

21. An electrolyte including a solution containing the ionic liquid described above in 1 to 8, in which the electrolyte is used for forming an oxide film on a metal surface by anodization.

22. An electrolyte including a solution containing the ionic liquid described above in 9 to 22, in which the electrolyte is used for an electrolytic capacitor.

The means described above in 1 was achieved on the basis of the finding by the inventor that an ionic liquid has an excellent metal oxidizing ability. The means described above in 2 permits the solution containing the ionic liquid to repair a defect of a metal oxide film previously formed by another method. The means described above in 3 to 7 can exhibit a particularly excellent ability of forming and repairing an oxide film on a valve metal surface. The means described above in 8 is capable of controlling the ability of forming an oxide film on a valve metal surface and the ability of repairing an oxide film. The means described above in 9 relates to an electrolytic capacitor using the method for forming an oxide film on a metal surface by any of the above-described anodization means or the method for repairing a defect of an oxide film. The means described above in 10 relates to an electrolytic capacitor using the above-described method for forming an oxide film on a valve metal surface and the method for repairing a defect of an oxide film. The means described above in 11 to 13 relate to a high-performance capacitor having the excellent electron conductivity of the conductive polymer and an oxide film repairing property based on the excellent ion conductivity of the ionic liquid, and having excellent impedance characteristics. The means described above in 14 and 15 relate to a high-performance capacitor having the excellent electron conductivity of the TCNQ salt and an oxide film repairing property based on the excellent ion conductivity of the ionic liquid, and having excellent impedance characteristics. The means described above in 15 to 20 can exhibit a particularly excellent ability of forming and repairing an oxide film on a valve metal surface. The means described above in 21 and 22 relate to an electrolyte which imparts the ability of forming and repairing an oxide film on a valve metal surface to an electrolytic capacitor.

REFERENCE NUMERALS

Figure 1:
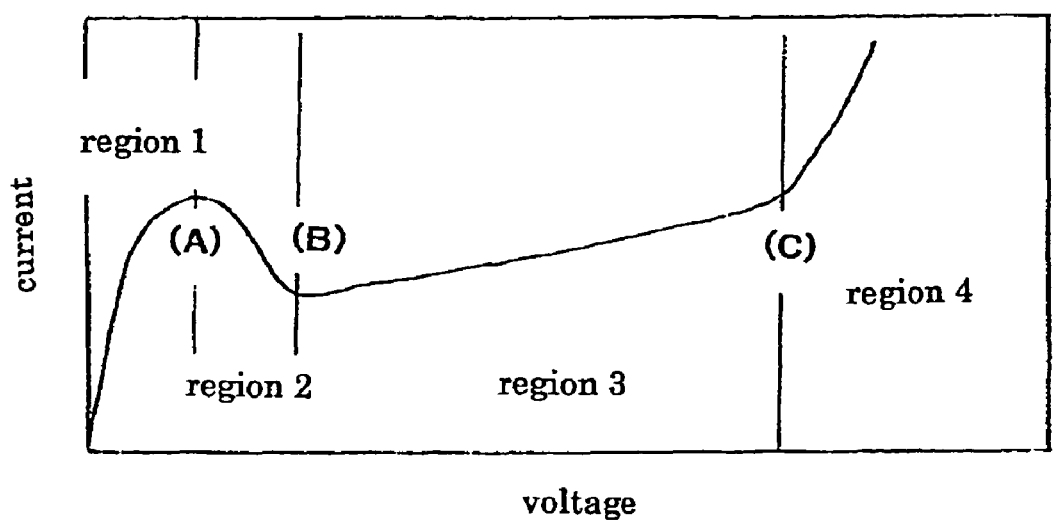
FIG. 1 shows typically observed changes in current when an electrolyte has an ability of repairing a metal oxide film.

A: start point of decrease in current by re-formation reaction
B: end point of re-formation
C: point indicating withstand voltage of electrolyte
1: polymerization initiating electrode
2: aluminum foil
3: dielectric layer
4: manganese oxide conductive layer
5: conductive polymer layer
6: electrolytic solution
7: cathode

BEST MODE FOR CARRYING OUT THE INVENTION

As a result of various investigations for resolving the above-descried problems, the inventor of the present invention has found that a series of compound groups referred to as "ionic liquids" exhibits an excellent anodizing property, resulting in the achievement of the present invention.

An ionic liquid used in the present invention is referred to as a "room-temperature molten salt" and is liquid at room temperature in spite of being composed of an anion component and a cation component. Unlike ordinary organic solvents, an ionic liquid is not partially ionized or dissociated but is composed of only ions. In other words, it is thought that the ionic liquid is 100% ionized. Although the term "ionic liquid" generally means a liquid at room temperature, the ionic liquid used in the present invention is not necessarily liquid at room temperature as long as it becomes liquid by aging or heat treatment of a capacitor and spreads over the whole of an electrolyte of the capacitor or becomes liquid by the Joule heat generated in a repair of an oxide film. As a cation used for the ionic liquid suitable for the object of the present invention, various cations having quaternary nitrogen can be used. Examples of the cation include ammonium and its derivatives, imidazolinium and its derivatives, pyridinium and its derivatives, pyrrolizinium and its derivatives, pyrrolinium and its derivatives, pyrazinium and its derivatives, pyrimidinium and its derivatives, triazonium and its derivatives, triazinium and its derivatives, triazine derivative cations, quinolinium and its derivatives, isoquinolinium and its derivatives, indolinium and its derivatives, quinoxalinium and its derivatives, piperazinium and its derivatives, oxazolinium and its derivatives, thiazolinium and its derivatives, morpholinium and its derivatives, and piperazine and its derivatives. In particular, imidazolinium derivatives, ammonium derivatives, and pyridinium derivatives can be preferably used for the object of the present invention. Here, the term "derivatives" means having substituents such as hydrogen, aliphatic hydrocarbon groups, alicyclic hydrocarbons, aromatic hydrocarbons, carboxylic acids, ester groups, ether groups, acyl groups, and amino groups. Any position of the cation component is substituted by such a substituent.

As the anion component preferably used for the object of the present invention, fluorine-containing anions can be used. Examples of the anions include $BF_4^-$, $PF_6^-$, and $R_A SO_3^-$ (wherein $R_A$ represents a fluorinated substituent containing a fluorinated aliphatic hydrocarbon group, a fluorinated alicyclic hydrocarbon group, a fluorinated aromatic hydrocarbon group, an ether group, an ester group, an acyl group, or the like). Specific examples include $CF_3SO_3^-$, $(CF_3SO_2)_2N^-$, $(CF_3SO_2)_3C^-$, $CHF_2CF_2CF_2CF_2CH_2OSO_3^-$, $CHF_2CF_2CF_2CF_2CH_2SO_3^-$, and the like. These substituents can be preferably used for the object of the present invention, and $BF_4^-$ is also preferably used as the anion for the purpose. Of course, the fluorine anion suitable for the present invention is not limited these examples.

As the anion component preferably used in the present invention, an atomic group including a sulfonic acid anion ($—SO_3^-$) can be used. The atomic group is represented by $R_B SO_3^-$ ($R_B$ represents a substituent containing an aliphatic hydrocarbon group, an alicyclic hydrocarbon group, an aromatic hydrocarbon group, an ether group, an ester group, an acyl group, or the like) and may contain fluorine. Specific examples of the atomic group include $pCH_3C_6H_4SO_3^-$, $C_6H_5SO_3^-$, $CH_3CH_2OCH_2CH_2OSO_3^-$, $C_6H_5OCH_2CH_2OSO_3^-$, and the like. In particular, anions containing both fluorine and a sulfonic acid anion are preferably used for the object of the present invention. Specific examples of such anions include $CHF_2CF_2CF_2CF_2CH_2OSO_3^-$, $CHF_2CF_2CF_2CF_2CH_2SO_3^-$, and the like. Of course, the sulfonic acid-containing anion suitable for the present invention is not limited to these examples.

As the anion component preferably used in the present invention, an atomic group containing a carboxylate anion (—COO⁻) can also be used. Specific examples of such an atomic group include $R_CCOO^-$, $^-OOCR_CCOOH$, $^-OOCR_C-CCOO^-$, and $NH_2CHR_CCOO^-$ (wherein $R_C$ represents a substituent containing an aliphatic hydrocarbon group, an alicyclic hydrocarbon group, an aromatic hydrocarbon group, an ether group, an ester group, an acyl group, or the like). Of course, the atomic group may contain fluorine. Specifically, it is effective to synthesize the ionic liquid containing a carboxylate anion (—COO⁻) using formic acid, acetic acid, maleic acid, adipic acid, oxalic acid, phthalic acid, succinic acid, or an amino acid. Of course, the carboxylate (—COO⁻) suitable for the present invention is not limited to these examples.

The anion preferably used in the present invention can be further exemplified by $NO_3$— and $R_dNO_3$— (wherein $R_d$ represents a substituent containing an aliphatic hydrocarbon group, an alicyclic hydrocarbon group, an aromatic hydrocarbon group, an ether group, an ester group, an acyl group, or the like, and may contain fluorine).

Among zwitterion-type ionic liquids each containing a cation and an anion bonded together by a covalent bond, an ionic liquid containing a sulfonic acid anion or an ionic liquid containing fluorine can be preferably used for the object of the present invention. The ionic liquid of the present invention includes a combination of the anion and the cation and can be synthesized by a known method. Specifically, a method, such as an anion exchange method, an acid ester method, or a neutralization method, can be used.

Next, an anodization process using the ionic liquid of the present invention will be described. The anodization process is widely used as means for forming a metal oxide film on a metal surface by applying a voltage or a current in an electrolytic solution using, as an anode, a metal on which the metal oxide is to be formed. This process is the most general process as means for forming an oxide film on the surface of a valve metal, particularly, aluminum, tantalum, niobium, or the like. Although the method for forming an oxide film of the present invention will be descried with reference to an example using aluminum, the method can be applied to other valve metals, such as tantalum and niobium. In addition, the method can be applied to aluminum and/or its alloys, tantalum and/or its alloys, niobium and/or its alloys, and other metals in the basically same manner. The application range of the present invention is not limited to aluminum, and the present invention can be applied to valve metals, such as tantalum and niobium.

The anodizing ability of an electrolytic solution is measured as follows: A cell including an aluminum anode and a stainless steel, copper or platinum cathode is immersed in the electrolytic solution, and a predetermined voltage is applied between the electrodes to measure changes in the current flowing between the electrodes. The applied voltage may be increased at a constant rate to measure changes in the current. Namely, when an insulating oxide film is formed on a metal surface due to the oxide film forming ability of the electrolyte, no current flows. However, the oxide film forming ability of the electrolyte is limited, and the formed oxide film becomes impossible to resist the voltage with increases in the voltage, finally resulting in breakage of the film. The anodizing ability of the electrolyte can be estimated by measuring such a change in the current.

On the other hand, in order to evaluate the metal oxide film repairing ability of an electrolytic solution, it is advantageous to use an anodized film prepared in an existing electrolytic solution with a predetermined voltage, the film being partially defected by a predetermined method such as boiling the oxide film in boiling water. The specimen prepared by this method may be immersed in the electrolytic solution to be evaluated, and the voltage may be increased at a predetermined rate to measure changes in the current. This is referred to as a "re-formation evaluation method". In this method, the formation voltage of the previously formed anodized film is selected (i.e., the thickness of the anodized film is changed) so that the same experiment as the above-described oxide film formation experiment can be carried out. In other words, for example, when the oxide film is formed at 100 V, the anodizing ability of the electrolytic solution can be measured by observing the breakdown voltage (V) in the same experiment as the above-described oxide film formation experiment.

Therefore, the latter experiment of repairing a metal oxide film can be conducted as the former experiment of evaluating the anodizing ability. This applies to the device evaluation of an electrolytic solution for a capacitor of the present invention. Therefore, most evaluations are made by the latter method. When the electrolytic solution has the metal oxide film repairing ability, typically observed changes in the current are as shown in FIG. 1.

First, the current flows through a defected portion of an oxide film (region 1). When the electrolytic solution has the anodizing property, a new oxide film is formed in the defected portion by the film repairing ability of the electrolytic solution, thereby decreasing the current beyond the maximum (A) (region 2). The minimum point (B) of the current refers to the end point of repair, and a linear current increase region proportional to increases in the voltage appears after the minimum point (B) (region 3). When the voltage is further increased, however, the current deviates from a linear relation and starts to flow at a certain voltage (C) (region 4). This indicates the actual withstand voltage of the electrolytic solution and corresponds to the above breakdown voltage. When the electrolytic solution has no anodizing ability, of course, only the region 1 appears, and the current continuously flows to finally cause breakage of the oxide film.

There are two types of aluminum anodized films including a barrier-type dense film and a porous film. A barrier-type dense film is produced in a neutral solution of a borate, a phosphate, or the like, and a porous film is produced in an acid solution such as an aqueous solution of phosphoric acid, sulfuric acid, or oxalic acid. The porous film is produced due to local dissolution of the film during anodization. When the formation of such a porous film is started by local dissolution, protons in the solution enter the film due to a thermal function against an electric field, thereby starting a flow of a large quantity of ion current. In FIG. 1, at a voltage higher than point (C), the current increases due to a rapid increase in the ion current, and the increase point of the current is preferably as high as possible. Therefore, the anodizing ability of the electrolytic solution can be evaluated by measuring the voltage of each of the points (A), (B), and (C).

As an electrolyte generally used for anodization, a boric acid-based formation solution, an oxalic acid-based formation solution, a phosphoric acid-based formation solution, or an adipic acid-based formation solution can be used. For example, the phosphoric acid-based formation solution is prepared by dissolving 1.5 g of ammonium phosphate in 1 L of water. The adipic acid-based formation solution is prepared by dissolving 1 g of ammonium adipate in 1 L of water. In evaluation of these electrolytic solutions by the above-described re-formation method, the points (A), (B), and (C) lie in ranges of 10 V to 100 V, 20 V to 180 V, and 60 V to 200 V, respectively. With an acid formation solution such as the oxalic acid-based formation solution, the point (A) appears at a low voltage, and the point (C) also appears at a relatively low voltage. On the other hand, with a neutral formation solution such as the adipic acid-based formation solution, the point (C) can be increased, but the point (A) is also disadvantageously increased.

When the above-described ionic liquid containing a fluorine anion, an ionic liquid containing a sulfonic acid ($-SO_3^-$) anion, or an ionic liquid containing a carboxylate ($-COO^-$) anion is evaluated by the re-formation evaluation method, for example, with a voltage of first oxide film formation of 200 V, generally, the maximum current point (A) is in a range of 10 V to 25 V, and the minimum current point (B) is in a range of 30 V to 50 V. On the other hand, the current increase point (C) is in a range of 100 V to 200 V. These properties vary depending on the type of the ionic liquid, particularly the type of the anion. The fluorine anion-containing ionic liquid has the characteristic that the voltage of the point (C) is particularly increased (160 V or more), and the withstand voltage is excellent. In contrast, the ionic liquid containing a sulfonic acid ($-SO_3^-$) anion and the ionic liquid containing a carboxylate ($-COO^-$) anion show the point (C) at 60 V to 100 V.

This fact significantly appears when an oxide film is first formed at 200 V or less, for example, 50 V or 100 V. For example, with a voltage of first oxide film formation of 50 V, the ionic liquid containing a sulfonic acid ($-SO_3^-$) anion and the ionic liquid containing a carboxylate ($-COO^-$) anion show the point (C) at 30 V to 60 V, while the fluorine anion-containing ionic liquid shows the point (C) at 80 V to 170 V. On the other hand, with a voltage of first oxide film formation of 100 V, the ionic liquid containing a sulfonic acid ($-SO_3^-$) anion and the ionic liquid containing a carboxylate ($-COO^-$) anion show the point (C) at 50 V to 80 V, while the fluorine anion-containing ionic liquid shows the point (C) at 120 V to 200 V.

This indicates that the ionic liquid exhibits an excellent anodizing property in a relatively low voltage region (i.e., the point (A) appears at a low voltage), as compared with a general solution of an organic salt electrolyte in an organic solvent, but the withstand voltage (i.e., the point (C) at a low voltage) of an electrolyte in a high-voltage region must be improved according to the type of the ionic liquid, for example, the ionic liquid containing a sulfonic acid ($-SO_3^-$) anion or the ionic liquid containing a carboxylate ($-COO^-$) anion.

As a result of further research for improving the properties of the ionic liquids, it was found that the withstand voltage can be improved by adding an additive, such as an ammonium salt, an amine salt, a quaternary ammonium salt, a tertiary amine, or an organic acid, to an ionic liquid. An ionic liquid can sufficiently dissolve an ammonium salt, an amine salt, a quaternary ammonium salt, or an organic acid. Examples of the additive includes ammonium salt additives, such as ammonium adipate; amine salt additives, such as triethylamine maleate; quaternary ammonium salt additives, such as quaternary ammonium maleate and quaternary ammonium phthalate; ammonium phosphate additives, such as ammonium dihydrogen phosphate; ammonium borate; quaternary imidazolium salts; malic acid; and succinic acid. When such an additive is added to the above-described zwitterion-type ionic liquid, the melting point can be decreased, and thus the addition is effective to the object of the present invention.

In addition to the ionic liquid as a component, the electrolyte of the present invention may further contain a solute added for improving the performance as an electrolyte. Since the solute added to the electrolyte of the present invention is always present in a dissolved state because the ionic liquid actually does not evaporate, and thus the anodizing property of the solute is added to the anodizing property of the ionic liquid, thereby further improving the performance as an electrolyte. Examples of such a solute include ammonium borate, ammonium phosphate, and ammonium adipate. This method is particularly effective to a case in which the anodizing ability of the ionic liquid is not so high. Also, the addition of the solute can control a physical property, and for example, decrease the melting point of the ionic liquid as a component due to the freezing-point depression effect of the solute added.

The amount of the solute added to the ionic liquid can be arbitrarily selected in a range which does not lose any one of the liquid properties of the ionic liquid. For example, when ammonium adipate is added to the ionic liquid, the adding amount is preferably 1% by weight (simply referred to as "%" hereinafter) or more and lower than 50%, i.e., an ammonium adipate/ionic liquid ratio of 1/1, for improving the anodizing performance depending on the type of the ionic liquid. When ammonium borate is added, the adding amount is preferably lower than 50%. Similarly, when ammonium phosphate is added, the adding amount is preferably lower than 10%. The solubility of the solute in the ionic liquid is high, and a relatively large amount of the solute can be dissolved in the ionic liquid. This is of advantage to using the ionic liquid.

The ionic liquid containing an $AlCl^-$, $Cl^-$, or $Br^-$ anion may dissolve an oxide film by corrosion and etching. However, the ionic liquid containing fluorine-containing anion molecules favorably has no adverse effect, such as etching, on an oxide film. The degree of the anodizing ability depends on the molecular structure, but, in particular, the fluorine anion-containing ionic liquid which is hydrophilic has the excellent anodizing ability. The decision as to whether the ionic liquid is hydrophilic or hydrophobic is made on the criterion that when the ionic liquid is completely mixed with the water added, the ionic liquid is decided as hydrophilic, and when the ionic liquid and the water added are separated into two layers, the ionic liquid is decided as hydrophobic. The ionic liquid formed using $BF_4^-$ as an anion is frequently hydrophilic, and the ionic liquid formed by combining with imidazolium cations or pyridinium cations exhibits the excellent anodizing property.

Next, description will be made of the large practical advantage of the use of the ionic liquid in forming an oxide film on a metal surface, i.e., the advantage that the ionic liquid actually does not evaporate because of its very low vapor pressure. As described above, the electrolyte for anodization is generally used as an aqueous solution or a solution in an organic solvent, thereby causing the problem that water or an organic solvent used as the solvent evaporates. In a state in which the solvent evaporates to leave the solid solute alone, the ability of forming an oxide film on a metal surface is lost. Namely, a conventional electrolyte cannot be used in an environment in which a solvent evaporates. On the other hand, the method for forming an oxide film on a metal surface using the ionic liquid can be performed under such a condition that a general electrolyte cannot be used.

As an application utilizing the advantage of reaction of oxide film formation on a metal surface using the ionic liquid, use of the ionic liquid as a capacitor electrolyte will be described. When the ionic liquid of the present invention is used as a capacitor electrolyte, a first advantage is having the excellent anodizing property, and a second advantage is that the ionic liquid actually does not evaporate in an ordinary use state because of its very low vapor pressure.

In an electrolyte solution-type conventional electrolytic capacitor using an organic solvent, such as γ-butyrolactone, the electrolytic solution used further contains a solute added to the organic solvent. When such an organic solvent evaporates in long-term use, the solute added becomes solid after evaporation of the organic solvent, and thus the anodizing property which is the oxide film repairing ability cannot be exhibited. However, when the solute added is liquid, the solute component remains even after evaporation of the organic solvent, and thus the anodizing ability is not completely lost. Therefore, it is advantageous as an application of the present invention that the ionic liquid of the invention is used for an electrolytic solution-type capacitor.

The ionic liquid of the present invention is more preferably used for a solid electrolytic capacitor. In a solid electrolytic capacitor, only the anodizing property can be achieved to some extent by dissolving a solute, such as an ammonium salt, an amine salt, a quaternary ammonium salt, or an organic acid, in an organic solvent, and then adding the resultant solution to a conductive polymer or a TCNQ salt. However, there is the disadvantage that the effect of the addition is lost by evaporation of the solvent in long-term use.

When the electrolyte of the present invention is used for a solid capacitor, the ionic liquid is particularly preferably added (combined with) to a conductive polymer electrolyte or a TCNQ salt electrolyte. This is because the excellent electron conductivity of the conductive polymer electrolyte or TCNQ salt electrolyte is added to the excellent anodizing property of the ionic liquid, thereby realizing an ideal capacitor electrolyte.

First, use of the conductive polymer as the electrolyte will be described. The conductive polymer is not particularly limited, but polypyrrole, polythiophene, polyaniline, and derivatives thereof are preferred. An example of the derivatives is polythiophene obtained from a 1,4-dioxythiophene monomer. As a method for synthesizing the conductive polymer, a chemical polymerization method, an electrolytic polymerization method, and an organometallic chemical polycondensation method are used, and the chemical polymerization method and the electrolytic polymerization method are particularly preferably used.

The electrolytic polymerization is a method in which for example, a pyrrole monomer is dissolved in a solvent together with a supporting electrolyte and then subjected to dehydrogenation polymerization by anodization. This method is capable of depositing polypyrrole as the conductive polymer on an anode. Since a polymer generally has a lower oxidation-reduction potential than that of a monomer, oxidation of a polymer skeleton further proceeds in the polymerization process, and anion of the supporting electrolyte are taken as a dopant in the polymer with the oxidation. The mechanism of the electrolytic polymerization has the advantage that a conductive polymer is obtained without subsequent addition of a dopant.

On the other hand, the chemical polymerization is a method in which a raw material monomer, for example, pyrrole, is polymerized by oxidation dehydration in the presence of an appropriate oxidizing agent. As the oxidizing agent, a persulfate, hydrogen peroxide, or a transition metal salt of iron, copper, manganese, or the like can be used. The conductive polymer synthesized by the chemical polymerization contains the anion of the oxidization agent which is also taken as a dopant in the polymer during the polymerization process, and thus the conductive polymer can be obtained by one-stage reaction.

The chemical polymerization in the ionic liquid is particularly preferred for the object of the present invention because the anion of the ionic liquid may be taken as a dopant in the conductive polymer.

In the present invention, the dopant of the conductive polymer used as a component of the electrolyte is selected in view of the influence on the conductivity and thermal stability of the conductive polymer. Preferred examples of the dopant used in the present invention include 4-fluroboric acid ions, p-toluenesulfonic acid ions, anthraquinone-2-sulfonic acid ions, triisopropylnaphthalenesulfonic acid ions, polyvinylsulfonic acid ions, dodecylbenzenesulfonic acid ions, alkylsulfonic acid ions, n-propylphosphoric acid ions, and perchloric acid ions.

In order that the dopant is taken in the polymer by the electrolytic polymerization method, the dopant may be dissolved in the form of a sodium salt, an ester, an ammonium salt, or the like, such as sodium p-toluenesulfonate, sodium dodecylbenzenesulfonate, n-propylphosphate, tetra-n-butylammonium perchlorate, or the like, in a solvent, such as water or a nonaqueous solvent (acetonitrile, dimethylformamide, or the like), followed by the electrolytic polymerization in the resultant solution.

In use as an electrolyte for an electrolytic capacitor, the electrolyte is disposed on the surface of an oxide film formed on a valve metal, such as aluminum, tantalum, or niobium. The metal functions as an anode of an electrolytic capacitor and is used as an etched foil or a sintered body of a metal powder, for increasing the surface area. Therefore, when the conductive polymer is synthesized by the chemical polymerization, the spaces of the etched foil or the sintered powder must be filled with the conductive polymer. On the other hand, when the conductive polymer is synthesized by the electrolytic polymerization, an oxide film on a valve metal is a dielectric, and thus a conductive film must be previously formed on the dielectric for making the film conductive, followed by the electrolytic polymerization with the current or voltage applied from a power supply source. As the conductive film used for this purpose, a conductive polymer synthesized by the chemical polymerization, pyrolytic manganese dioxide, or the like can be used.

Next, description will be made of a method for compounding the ionic liquid and the conductive polymer to form the electrolyte of the present invention.

The simplest compounding method includes forming the conductive polymer on an oxide film on a valve metal by a known method, immersing the conductive film in the ionic liquid, and then pulling up the conductive film from the ionic liquid. The ionic liquid may contain a solute. In forming an electrolytic capacitor, a cathode forming step, an electrode mounting step, an armoring step, and an aging step may be subsequently performed. When an aluminum case is used, for example, for a coiled electrolytic capacitor, the ionic liquid is preferably added into the aluminum case.

The amount of the ionic liquid added is selected in a range in which the satisfactory anodizing property is exhibited, and the electron conductivity of the conductive polymer is not impaired. From the viewpoint that the electron conductivity is not impaired, the amount of the ionic liquid added is preferably a weight ratio of less than 1/10 to the conductive polymer. From the viewpoint of the satisfactory anodizing property, the amount of the ionic liquid added is preferably a weight ratio of 1/10000 or more and more preferably 1/1000 or more to the conductive polymer. In other words, the weight ratio (ionic liquid/conductive polymer) of the ionic liquid to the conductive polymer in the electrolyte of the present invention is preferably in a range of 1/10000 to less than 1/10 and more preferably 1/1000 to less than 1/10.

The necessary amount of the ionic liquid of the present invention may be significantly smaller than that of an electrolytic capacitor using an electrolyte composed of a conductive polymer and an organic onium salt, for example, as disclosed in Patent Document 3. In Patent Document 3, in order to improve the withstand voltage, the ratio between the conductive polymer (A) and the organic onium salt (B) is preferably (A):(B)=1:0.1 to 5 and more preferably (A):(B)= 1:0.2 to 2. However, in the present invention, as described above, the amount of the ionic liquid added is less than 10% relative to the conductive polymer, and the high electric conductivity of the conductive polymer is not impaired by adding the ionic liquid, thereby realizing a capacitor having excellent impedance properties.

A second compounding method uses the ionic liquid as a solvent for synthesizing the conductive polymer by the electrolytic polymerization or chemical polymerization so that the solvent used is positively left, for example, after the step of forming an electrolyte for an electrolytic capacitor. In this case, as described above, the weight ratio (ionic liquid/conductive polymer) of the ionic liquid to the conductive polymer is preferably in a range of 1/10000 to less than 1/10 and more preferably 1/1000 to less than 1/10.

In this method, it is more preferable as the compounding method that the anion type of the ionic liquid is the same as that of the dopant of the conductive polymer. There has been not known an example in which electrolytic polymerization reaction and doping of the conductive polymer are simultaneously performed with the same anion type, the ionic liquid is used as a solvent in synthesizing the conductive polymer by chemical polymerization which is capable of producing an electrolyte having both excellent electron conductivity and excellent ion conductivity, and then the ionic liquid is positively left after the polymerization and is added to the produced conductive polymer.

Next, use of the TCNQ salt as an electrolyte will be described. Although the TCNQ salt is not particularly limited, a TCNQ complex salt using an ammonium cation is preferably used. In particular, a TCNQ complex salt containing a nitrogen-containing heterocyclic compound having an alkyl substituent at the N position and used as a donor and TCNQ used as an acceptor is preferred for the object of the present invention. Examples of the nitrogen-containing heterocyclic compound include pyridine, pyridine derivatives such as lutidine, quinoline, quinoline derivatives such as isoquinoline, acridine, phenazine, and phenanthroline. Example of the alkyl substituent at the N position include butyl, amyl, hexyl, and phenethyl. As the electrolyte, these TCNQ salts are used alone or as a mixture of two or more, and an additive such as a glucose polymer may be added according to demand. The TCNQ salt is synthesized by dissolving TCNQ in a solvent such as purified and dehydrated acetonitrile, adding an ammonium salt (for example, N-n-butylisoquinolinium iodide or the like) to the solution, and separating and filtering off the precipitated TCNQ salt.

Examples of such a TCNQ salt include N-n-butylisoquinolinium $(TCNQ)_2$ salt, N-isoamylisoquinolinium $(TCNQ)_2$ salt, N,N-pentamethylene $(lutidine)_2(TCNQ)_4$ salt, N-phenethyl-lutidine $(TCNQ)_2$ salt, and mixtures of these TCNQ salts. The reasons why these TCNQ salts are particularly preferably used are that the salts have relatively high conductivity and that the salts have the peculiar property of being molten by heating. General TCNQ salts are decomposed or sublimed by heating, not molten by heating. An electrolyte for an electrolytic capacitor is disposed on the surface of a dielectric oxide film formed on a valve metal, such as aluminum, tantalum, or niobium. The metal functions as an anode of the electrolytic capacitor and is used as an etched foil or a sintered body of a metal powder, for increasing the surface area. Therefore, the pores of the etched foil or the spaces of the sintered powder must be filled with the TCNQ salt. The TCNQ salt property of being molten is excellent for a method used for melting and filling the TCNQ salt in an etched aluminum electrode or a sintered tantalum electrode.

The amount of the ionic liquid added is selected in a range in which the satisfactory anodizing property is exhibited, and the electron conductivity of the TCNQ salt is not impaired. From the viewpoint that the electron conductivity is not impaired, the amount of the ionic liquid added is preferably a weight ratio of less than 1/2, more preferably 1/5 or less, and most preferably 1/10 or less to the TCNQ salt. From the viewpoint of the satisfactory anodizing property, the amount of the ionic liquid added is preferably a weight ratio of 1/10000 or more and more preferably 1/1000 or more to the TCNQ salt. In other words, the weight ratio (ionic liquid/TCNQ salt) of the ionic liquid to the TCNQ salt in the electrolyte of the present invention is preferably in a range of 1/10000 to less than 1/2 and more preferably 1/10000 to 1/5 to, and most preferably 1/1000 to 1/10.

Next, a method for compounding the ionic liquid and the TCNQ salt for forming the electrolyte of the present invention will be described. The combining method is capable of obtaining an electrolyte having excellent electron conductivity and the excellent anodizing property.

The simplest compounding method includes forming the TCNQ salt on an oxide film on a valve metal by a known method, immersing the TCNQ salt in the ionic liquid, and then pulling up the TCNQ salt therefrom. In order to form an electrolytic capacitor, a cathode forming step, an electrode mounting step, an armoring step, and an aging step may be subsequently performed.

In a coiled capacitor using an aluminum case, the ionic liquid and the TCNQ salt are added into the aluminum case and heat-molten, and then a capacitor element coiled together with Manila hemp paper and including an anode and a cathode is inserted in the aluminum case and impregnated with the ionic liquid and the TCNQ salt. When an electrolytic capacitor is formed, a sealing step and an aging step may be subsequently performed. For a capacitor which is not a coiled type, the TCNQ salt may be formed on an oxide film on a valve metal by a known method, immersed in the ionic liquid, and then pulled up therefrom. When an electrolytic capacitor is formed, a cathode mounting step, an armoring step, and an aging step may be subsequently performed.

The present invention will be described in further detail below with reference to examples.

EXAMPLES

Ionic Liquid

First, the ionic liquid used as a component of the electrolyte of the present invention is described. Hereinafter, when a synthesized material was used, a synthesis method therefor is described, while when a commercial available material was used, a synthesis method therefor is not described. The molecular formulae, physical properties, and abbreviations (ILS-1 to ILS-23) of the ionic liquids used are given below. In the formulae, Im represents imidazolium, and Py represents pyridinium.

(ILS-1) $(1-C_2H_5-3-C_2H_5-Im)^+(p-CH_3-C_6H_4SO_3)^-$

In a 200-ml dry round-bottom flask, 4.02 g (41.7 mmol) of N-ethylimidazole and 20 ml of DMF were charged, and the resultant mixture was sufficiently stirred. Then, 8.35 g (41.7 mmol) of ethyl p-toluenesulfonate was rapidly added to the flask under cooling with ice. After the addition, the mixture was further stirred for 23 hours. The reaction solution was added dropwise to 200 ml of ice-cooled ether. The ether was decanted to recover 8.1 g of a yellow liquid. The yield was 65.5%. The recovered liquid was identified by its $^1$H-NMR spectrum. The obtained product had a glass transition temperature (Tg) of −59.5° C.

[Spectral data]: 500 MHz, $^1$H-NMR (DMSO-$d_6$) σ=1.35 (triplet, J=5 Hz, 3H), 2.23 (singlet, 3H), 4.15 (quartet, J=5 Hz, 2H), 7.06 (doublet, J=5 Hz, 2H), 7.44 (doublet, J=5 Hz, 2H), 7.74 (singlet, 2H), 9.04 (singlet, 3H)

(ILS-2) $(1\text{-}CH_3\text{-}3\text{-}C_2H_5\text{-}Im)^+(p\text{-}CH_3\text{—}C_6H_4SO_3)^-$ 1-Methyl-3-ethylimidazolium p-toluenesulfonate was synthesized by the same method as described above. The product was a yellow liquid, and the yield was 74.4%. The recovered liquid was identified by its $^1$H-NMR spectrum. The obtained product had a glass transition temperature (Tg) of −85.7° C. and a melting point of −12.7° C.

[Spectral data]: 500 MHz, $^1$H-NMR (DMSO-$d_6$) σ=1.33 (triplet, J=5 Hz, 3H), 2.22 (singlet, 3H), 3.77 (singlet, 3H), 4.12 (quartet, J=5 Hz, 2H), 7.06 (doublet, J=5 Hz, 2H), 7.44 (doublet, J=5 Hz, 2H), 7.65 (singlet, 2H), 7.72 (singlet, 2H), 9.08 (singlet, 3H)

(ILS-3) $(1\text{-}nC_4H_9\text{-}3\text{-}C_2H_5\text{-}Im)^+(p\text{-}CH_3\text{—}C_6H_4SO_3)^-$ 1-Butyl-3-ethylimidazolium p-toluenesulfonate was synthesized by the same method as described above. The product was a yellow liquid and had a glass transition temperature (Tg) of −73.8° C.

(ILS-4) $(1\text{-}C_2H_5\text{-}Im)^+(C_6H_5SO_3)^-$

1-Ethylimidazolium benzenesulfonate was synthesized by the same method as described above. The product was a colorless transparent liquid and had a glass transition temperature of −65.1° C. and a melting point of −9.5° C.

(1LS-5) $(1\text{-}C_2H_5\text{-}Im)^+(CH_3COO)^-$

First, 6 ml of 99.7% acetic acid was added to 10 g of N-ethylimidazole, and the resultant mixture was stirred for 12 hours at a temperature kept at 0° C. The resultant reaction product was added dropwise to 1000 ml of diethyl ether under stirring. The diethyl ether was distilled off at room temperature, and the residue was dried under vacuum to precipitate crystals. The precipitated crystals were recovered to obtain 15.9 g of N-ethylimidazolium acetate. The product had a glass transition temperature of −51.7° C.

(ILS-6) $(1\text{-}nC_4H_9\text{-}2\text{-}CH_3\text{-}3\text{-}CH_3\text{-}Im)^+(C_2H_5OC_2H_4OSO_3)^-$: brown liquid, melting point −4.2° C.

(ILS-7) $(1\text{-}nC_4H_9\text{-}3\text{-}CH_3\text{-}Im)^+$ $(CHF_2CF_2CF_2CF_2CH_2SO_3)^-$: yellow liquid, melting point −62° C.

(ILS-8) $(1\text{-}C_2H_5\text{-}Im)^+(BF_4)^-$: colorless liquid, melting point −53.3° C.

(ILS-9) $(1\text{-}C_2H_5\text{-}3\text{-}CH_3\text{-}Im)^+((CF_3SO_2)_2N)^-$: colorless liquid, melting point −18.2° C.

(ILS-10) $(1\text{-}nC_6H_{13}\text{-}Py)^+((CF_3SO_2)_2N)^-$: yellow liquid.

(ILS-11) $(1\text{-}CH_3\text{-}2\text{-}CH_3\text{-}3\text{-}C_2H_5\text{-}4\text{-}C_2H_4OC_2H_4OCH_3N)^+((CF_3SO_2)_2N)^-$: colorless liquid.

(ILS-12) $(1\text{-}CH_3\text{-}3\text{-}C_2H_5\text{-}Im)^+((CF_3SO_2)_3C)^-$: yellow liquid.

(ILS-13) $(1\text{-}C_2H_5\text{-}Im)^+(CH_3CH_2CH_2CH_2SO_3)^-$

First, 5.30 g (55.1 mmol) of N-ethylimidazole was dissolved in 50 ml of acetone. Next, 7.61 g (55.9 ml) of propane sultone was dissolved in 100 ml of acetone, and the resultant solution was added dropwise to the N-ethylimidazole acetone solution at room temperature, followed by reaction under further stirring for 91 hours at room temperature. The resultant reaction mixture was filtered by suction using a Nutsche aspirator provided with a glass filter. The product filtered off on the glass filter was sufficiently washed with excess acetone and then dried under vacuum to obtain 1.42 g of the product. The yield was 11.1%. The product was identified as 1-(N-ethylimidazolio)butane-4-sulfonate by its $^1$H-NMR spectrum. As a result of measurement by differential scanning calorimetry (DSC), the melting point was −10° C.

[Spectral data]: 500 MHz, 1H-NMR (DMSO-$d_6$) σ=1.36 (triplet, 3H), 1.48 (triplet, 2H), 1.84 (triplet, 2H), 2.36 (triplet, 2H), 4.13 (multiplet, 4H), 7.77 (d.d., 2H), 9.20 (singlet, 1H)

(ILS-14) $(1\text{-}C_2H_5\text{-}Im)^+(C_6H_5SO_3)^-$

First, 4.02 g (41.7 mmol) of N-ethylimidazole was dissolved in 50 ml of ethanol. Next, 8.35 g (41.7 mmol) of p-toluenesulfonic acid monohydrate was rapidly added to the N-ethylimidazole ethanol solution under ice-cooling, followed by stirring for 23 hours. The ethanol was distilled off with an evaporator, and the residual reaction solution was added dropwise to 200 ml of ether cooled with dry ice. The resultant mixture was rapidly filtered by suction using a Nutsche aspirator provided with a glass filter to recover 8.10 g of the product on the glass filter. The yield was 65.5%. The product was identified as 1-ethyl-imidazolium-p-toluenesulfonate by its $^1$H-NMR spectrum. The obtained imidazolium salt had a glass transition temperature (Tg) of 4.3° C.

[Spectral data]: 500 MHz, 1H-NMR (DMSO-$d_6$, σ) σ=1.35 (triplet, J=5 Hz, 3H), 2.23 (singlet, 3H), 4.15 (quartet, J=5 Hz, 2H), 7.06 (doublet, J=5 Hz, 2H), 7.44 (doublet, J=5 Hz, 2H), 7.74 (singlet, 2H), 9.04 (singlet, 1H)

(ILS-15) $(1\text{-}nC_4H_9\text{-}Im)^+(p\text{-}CH_3\text{—}C_6H_4SO_3)^-$

First, 3.80 g (30.6 mmol) of N-butylimidazole was dissolved in 20 ml of DMF (dimethylformamide). Next, 5.20 g (30.6 mmol) of p-toluenesulfonic acid monohydrate was rapidly added to the N-butylimidazole DMF solution under ice-cooling, followed by stirring for 23 hours. The reaction solution was added dropwise to 200 ml of ether cooled with dry ice. The resultant mixture was rapidly filtered by suction using a Nutsche aspirator provided with a glass filter to recover 6.40 g of a white solid on the glass filter. The yield was 70.6%. The recovered product was identified as 1-butyl-imidazolium-p-toluenesulfonate by its $^1$H-NMR spectrum. The obtained imidazolium salt had a glass transition temperature (Tg) of −38.4° C. and a crystallization temperature (Tc) of 2.6° C.

[Spectral data]: 500 MHz, 1H-NMR (DMSO-$d_6$) σ=0.84 (triplet, J=5 Hz, 3H), 1.16 (multiplet, 2H), 1.71 (multiplet, 2H), 2.23 (singlet, 3H), 4.11 (trilet, J=5 Hz, 2H), 7.07 (doublet, J=5 Hz, 2H), 7.44 (doublet, J=5 Hz, 2H), 7.60 (singlet, 1H), 7.71 (singlet, 1H), 9.04 (singlet, 3H)

(ILS-16) $(1\text{-}CH_2\text{=}CH\text{-}Im)^+(CH_3SO_3)^-$

First, 7 ml of methanesulfonic acid was added to 10 g of N-vinylimidazole, and the resultant mixture was stirred for 3 hours at a temperature kept at 0° C. and then added dropwise to diethyl ether cooled with dry ice. The resultant mixture was rapidly filtered by suction using a Nutsche aspirator provided with a glass filter to recover crystals on the glass filter. The crystals were dried to obtain 19.2 g of N-vinylimidazolium methanesulfonate. The yield was 95%, and the melting point was 5° C.

(ILS-17) N-Vinylimidazolium Molten Salt Polymer

First, 1.0 g of the ILS-16 was dissolved in 10 ml of methanol, and azobisisobutyronitrile was added as a polymerization initiator to the resultant solution at a molar ratio of 1% relative to the vinyl monomer unit of the ILS-16. Then, radical polymerization was performed at a temperature of 65° C. for 3 hours to obtain N-vinylimidazolium molten salt polymer (ILS-17).

(ILS-18) $(1\text{-}nC_4H_9\text{-}3\text{-}CH_3\text{-}Im)^+(BF_4)^-$

1-Butyl-3-methylimidazolium tetrafluoroborate (mp −71° C.), manufactured by Kanto Kagaku Co., Ltd.

(ILS-19) $(1\text{-}nC_4H_9\text{-}Py)^+(BF_4)^-$

1-Butylpyridinium tetrafluoroborate (mp −88° C.), manufactured by Kanto Kagaku Co., Ltd.

(ILS-20) $(1\text{-}nC_6H_{13}\text{-}3\text{-}CH_3\text{-}Im)^+(PF_6)^-$
1-Hexyl-3-methylimidazolium hexafluorophosphate (mp −73° C.), manufactured by Kanto Kagaku Co., Ltd.
(ILS-21) $(1\text{-}C_2H_5\text{-}3\text{-}CH_3\text{-}Im)^+(CF_3SO_3)^-$
1-Ethyl-3-methylimidozolium trifluoromethanesulfonate (mp −9° C.), manufactured by Kanto Kagaku Co., Ltd.
(ILS-22) $(1\text{-}nC_6H_{13}\text{-}3\text{-}CH_3\text{-}Im)^+(Br)^-$
1-Hexyl-3-methylimidazolium bromide (mp −52° C.), manufactured by Kanto Kagaku Co., Ltd.
(ILS-23) $(1\text{-}nC_6H_{13}\text{-}3\text{-}CH_3\text{-}Im)^+(Cl)^-$
1-Hexyl-3-methylimidazolium chloride (mp −85° C.), manufactured by Kanto Kagaku Co., Ltd.
(ILS-24) $(1\text{-}C_2H_5\text{-}3\text{-}CH_3\text{-}Im)^+(Cl)^-$
1-Ethyl-3-methylimidazolium chloride, manufactured by Kanto Kagaku Co., Ltd.
(ILS-25) $(1\text{-}C_2H_5\text{-}3\text{-}CH_3\text{-}Im)^+(Br)^-$
1-Ethyl-3-methylimidazolium bromide, manufactured by Kanto Kagaku Co., Ltd.
(Synthesis of TCNQ Salt)

Synthesis examples of the TCNQ salt used as a component of the electrolyte of the present invention will be described.
(Salt A) N-n-Butylisoquinolinium $(TCNQ)_2$ Salt To a flask provided with a reflux condenser, commercial n-butyl iodide (20 mmol) and isoquinoline (20 mmol) were added, followed by heating to 80° C. Since a yellow oily product was separated from a liquid phase, heating was stopped when the product started to be generated, and the reaction was controlled to slowly proceed using hot water (about 40° C.). The reaction proceeded about 100%, and thus the reaction was terminated when the whole reaction solution was turned to an oily state. When the heating was stopped, the product was immediately crystallized (solidified). The product was washed with ethyl ether and then purified by recrystallization with methanol.

The n-butylisoquinoline iodide (25 mmol) obtained by the above-described method and TCNQ (30 mmol) were dissolved in 30 ml of acetonitrile and 60 ml of acetonitrile, respectively, under heating, and both solutions were mixed while being gently boiled. After mixing, the resultant mixture was heated for 1 hour under reflux to complete the reaction. After the completion of the reaction, the mixture was allowed to stand at room temperature for 1 hour and cooled at 5° C. overnight, and the produced dark purple crystals were filtered off. The resultant crystals were washed with a small amount of cooled acetonitrile and further with ethyl ether. The resultant salt had an electric conductivity of 3.4 Ωcm and a melting point of 210° C., and the yield was 80%.
(Salt B) N-Isoamylisoquinolinium $(TCNQ)_2$ Salt An N-isoamylisoquinolium $(TCNQ)_2$ salt was synthesized by the same method as that for salt (A) except that n-isoamyl iodide was used in place of n-butyl iodide. The resultant salt had an electric conductivity of 4.2 Ωcm and a melting point of 213° C., and the yield was 78%.
(Evaluation of Anodizing Ability)

An aluminum anodization experiment using an ionic liquid will be described. The anodizing property was evaluated as follows: A film formed on an aluminum plate with a purity of 99.9% by anodization at 200 V using an adipic acid solution was partially broken with boiling water. The film sample was subjected to re-formation (re-anodization) in an ionic liquid to measure changes in a current flowing with a voltage applied.

Example 1

An aluminum wire (1.5 mm in diameter) with a purity of 99.99% was dipped in a mixture containing 70% $HNO_3$ (15 parts) and 85% $H_3PO_4$ (85 parts) for 2 minutes, and then washed with pure water. Next, the wire was etched with a 1N NaOH solution for 10 minutes, washed with pure water, dipped in acetone, and then dried.

Next, the aluminum wire was subjected to formation treatment in an aqueous solution (1 g/L) of adipic acid. The formation treatment was performed with a constant current of 10 $mA/cm^2$, and after the voltage reached 200 V, the wire was maintained at a constant voltage of 200 V for 10 minutes. After the formation, the formed film was treated with boiling water for 3 minutes with 100 V and a DC current applied so that the Al (aluminum) side was a positive pole. The formed film was partially broken by the treatment.

Figure 2:
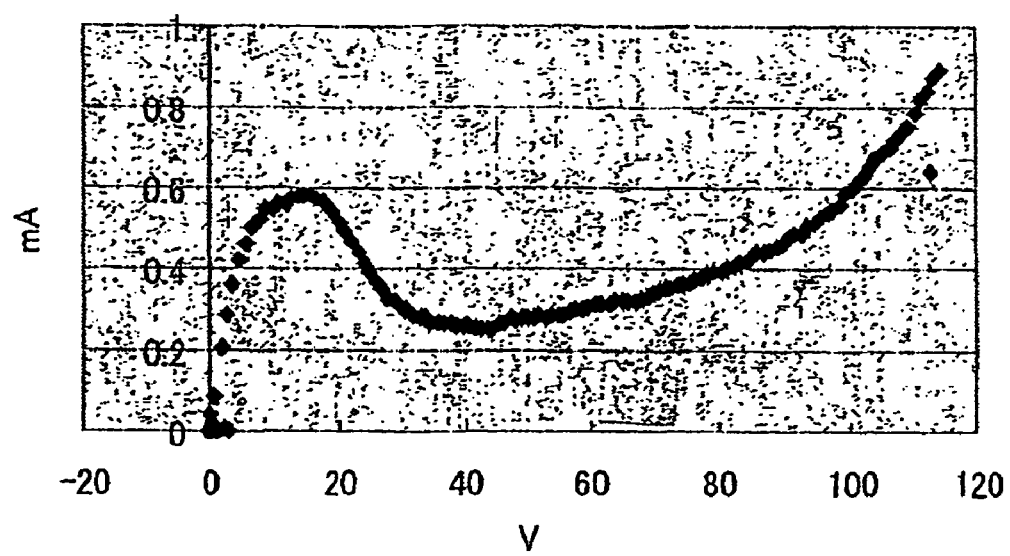
FIG. 2 shows changes in current in re-formation (oxide film repairing experiment) using ILS-1 under the following conditions: an initial formation voltage of 200 V, a rate of voltage rise of 1 V/sec, and a measurement temperature of room temperature.

The formed film treated as described above was immersed in an ionic liquid, and changes in the current value with increases in the voltage at a rate of 1 V/sec at room temperature were measured. FIG. 2 shows the changes in the current using the ILS-1.

The current first flows through the broken portion of the oxide film (region 1). However, when the electrolytic solution has the anodizing property, a new oxide film is formed in the broken portion by the film repairing ability of the electrolytic solution, and thus the current decreases beyond the maximum (point A: near 15 V) (region 2). The minimum current value (point B: near 40 V) is at the end point of repair, and a linear current increase region based on ion conductivity then appears (region 3), in which the current increases in proportion to increases in the voltage. However, when the voltage is further increased, the current deviates from the linear relation at a voltage (point C: near 80 to 100 V) and starts to flow (region 4). This voltage indicates the actual withstand voltage of the electrolytic solution. Of course, when the electrolytic solution has no anodizing ability, only the region 1 appears, and the current continuously flows to lead to the breakage of an oxide film. It was confirmed from these results that the ILS-1 has the excellent anodizing property.

Comparative Example 1

Figure 3:
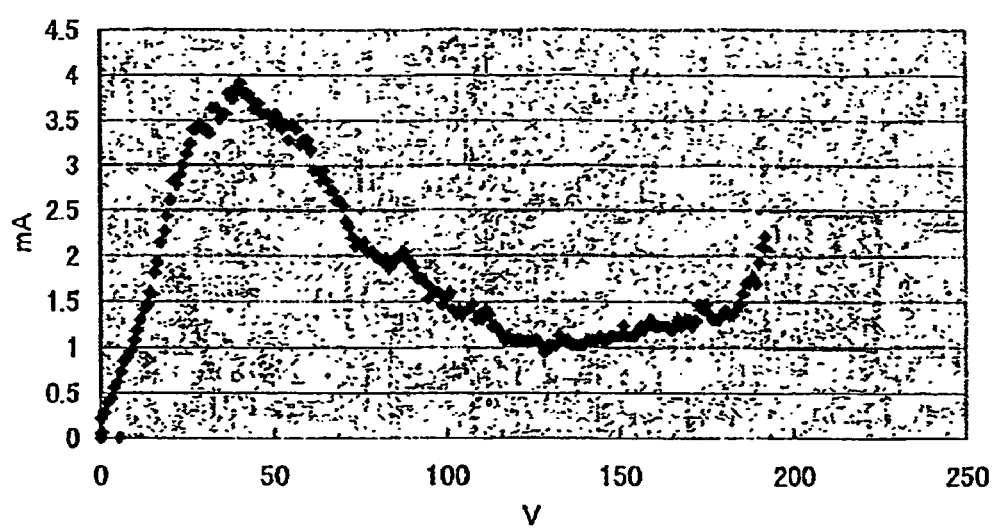
FIG. 3 shows changes in current in re-formation (oxide film repairing experiment) using an aqueous adipic acid solution (1 g/l) under the following conditions: an initial formation voltage of 200 V, a rate of voltage rise of 1 V/sec, and a measurement temperature of room temperature.

The same re-formation (re-anodization) experiment was carried out using an aqueous adipic acid solution. The results of the experiment are shown in FIG. 3. The aqueous adipic acid solution was prepared by dissolving 1 g of ammonium adipate in 1 L of distilled water and had a conductivity of 400 Ωcm at 70° C. and a pH 6.8.

In use of adipic acid, the maximum current is shown near 45 V (point A) and then decreases to the minimum near 120 V (point B), and the current then starts to increase at a voltage of 180 V (point C).

In comparison between the formation characteristics of the above-described ILS-1 and adipic acid, it is found that the ILS-1 is an excellent material exhibiting the anodizing property (re-formation) at a low voltage, but, in the ILS-1, a withstand voltage of about 80 to 100 V can be realized even with the film formed with 200 V. However, in adipic acid, an excellent withstand voltage property up to 180 V is exhibited, but the re-formation ability is not exhibited in a low voltage region of 40 V or less. Therefore, adipic acid is found to be disadvantageous in that it cannot be applied to repair in such a low voltage region.

Examples 2 to 12

The same experiment as in Example 1 was carried out using each of the ILS-2 to ILS-12. The results of the experiments are shown in Table 1. In the table, a blank (marked with "–") indicates that a definite voltage value was not observed.

TABLE 1

Evaluation of anodizing ability (re-formation experiment): influence of type of ionic liquid

| Experiment No. | Ionic liquid | Point A (V) | Point B (V) | Point C (V) |
|---|---|---|---|---|
| Example 1 | ILS-1 | 15 | 40 | 80-100 |
| Example 2 | ILS-2 | 15 | 40-50 | 120 |
| Example 3 | ILS-3 | 15 | 40-50 | 120 |
| Example 4 | ILS-4 | 15 | 40-50 | 100 |
| Example 5 | ILS-5 | 10 | 30-40 | 80 |
| Example 6 | ILS-6 | — | 40-50 | 90 |
| Example 7 | ILS-7 | — | 50-70 | 170 |
| Example 8 | ILS-8 | 15 | 40-90 | 160 |
| Example 9 | ILS-9 | 20 | 50 | ≧200 |
| Example 10 | ILS-10 | 30 | 50-70 | ≧200 |
| Example 11 | ILS-11 | 30 | 50 | ≧200 |
| Example 12 | ILS-12 | 30 | 70 | 180 |
| Comparative Example 1 | | 45 | 120 | 180 |
| Comparative Example 2 | ILS-24 | — | — | — (20 or less) |
| Comparative Example 3 | ILS-25 | — | — | — (20 or less) |

Table 1 shows the voltages of the points A, B, and C. In the table, a blank (marked with "—") indicates that a definite voltage value was not observed.

In the table, each of the ILS-2 to ILS-12 is ILS or fluorine anion-containing ILS according to the present invention. The results indicate that any one of the ILSs has the excellent anodizing ability. However, the results also indicate that the voltages of the points A, B, and C vary depending on the type of the ILS, and the ILSs have different performances. Any one of the fluorine anion-containing ILSs has a high withstand voltage (point C). The ILSs each containing an atomic group anion containing a sulfonic acid anion (—$SO_3^-$) or carboxylate anion (—$COO^-$) are inferior in the withstand voltage property to the fluorine anion-containing ILSs but have the excellent anodizing ability (i.e., low points A and B). It is further found that the anodizing property is little affected by the type of the cation component, for example, imidazolium, pyridinium, or ammonium.

Comparative Examples 2 and 3

The same experiment as in Example 1 was carried out using each of two types of ionic liquids, i.e., 1-ethyl-3-methylimidazolium chloride (ILS-24) and 1-ethyl-3-methylimidazolium bromide (ILS-25). As a result, it was found that when an anion is a chlorine or bromine anion, the points A, B, and C do not obviously appear, and the withstand voltage is extremely low (i.e., the point C at 20 V or less). This is possibly due to the fact that a metal oxide film is etched with a chlorine or bromine anion component. Therefore, it is thought that a chlorine- or bromine-containing ionic liquid is unsuitable for the object of the present invention.

Examples 13 to 22

The same experiment as in Example 1 was carried out except that the first formation voltage was 50 V or 100 V. The results are shown in Table 2. In the table, a blank (marked with "—") indicates that a definite voltage value was not observed.

TABLE 2

Evaluation of anodizing ability (re-formation experiment): influence of formation voltage

| | Ionic liquid | Formation voltage (V) | Point A (V) | Point B (V) | Point C (V) |
|---|---|---|---|---|---|
| Example 13 | ILS-2 | 50 | 15 | 20 | 60 |
| Example 14 | ILS-2 | 100 | 15 | 30 | 85 |
| Example 15 | ILS-3 | 50 | 15 | 20 | 55 |
| Example 16 | ILS-3 | 100 | 15 | 25 | 80 |
| Example 17 | ILS-7 | 50 | — | 50 | 80 |
| Example 18 | ILS-7 | 100 | — | 60 | 140-150 |
| Example 19 | ILS-8 | 50 | 15 | — | 160 |
| Example 20 | ILS-8 | 100 | 15 | — | 180-200 |
| Example 21 | ILS-10 | 50 | 20 | 40-120 | 160 |
| Example 22 | ILS-10 | 100 | 20 | 40-120 | 200 |

The results show that in 50-V formation, the ILSs (ILS-2 and ILS-3) each containing an atomic group anion including a sulfonic acid anion (—$SO_3^-$) have breakdown voltages of 55 to 60 V (point C), and the fluorine anion-containing ILSs (ILS-7, ILS-8, and ILS-10) have breakdown voltages of 120 V to 160 V. The ILS-7 contains a fluorine-containing sulfonic acid anion, but it is close to the ILS-8 and ILS-10 from the viewpoint of the withstand voltage. These results indicate that a breakdown voltage of 50 V or more is obtained with a sample formed with 50 V. This means that each of these ILSs has the same breakdown voltage even with an aluminum electrode not subjected to initial formation. It is thus found that the ILSs have the excellent anodizing ability.

It is also found that in 100-V formation, the breakdown voltages of the ILS-2 and ILS-3 are 85 V and 80 V, respectively, which are lower than the formation voltage. On the other hand, the breakdown voltages of the ILS-7, ILS-8, and ILS-10 are 150 V, 180 V, and 200 V, respectively. It is thus found that the fluorine anion-containing anionic liquids have the excellent withstand voltage property.

Examples 23 to 27

The same re-formation (anodization) experiment as described above was carried out using an electrolytic solution prepared by dissolving 10% by weight of adipic acid in an ionic liquid. The results are shown in Table 3. In the table, a blank (marked with "—") indicates that a definite voltage value was not observed.

TABLE 3

Evaluation of anodizing ability (re-formation experiment): influence of addition of adipic acid

| | Ionic liquid | Point A (V) | Point B (V) | Point C (V) |
|---|---|---|---|---|
| Example 23 | ILS-1 + adipic acid | 15 | 40 | 170 |
| Example 24 | ILS-2 + adipic acid | 15 | 40 | 180 |
| Example 25 | ILS-3 + adipic acid | 15 | 40 | 190 |
| Example 26 | ILS-7 + adipic acid | 15 | — | 200 |
| Example 27 | ILS-10 + adipic acid | 30 | — | ≧200 |

In a system prepared by adding 10% by weight of adipic acid to an ionic liquid, the point C can be increased (i.e., the withstand voltage of the electrolyte can be improved) as compared with a system including only an ionic liquid. This effect is not significant with the fluorine anion-containing ionic liquids (ILS-7 and ILS-10) originally having the excellent withstand voltage property, but the effect significantly appears with the ionic liquids (ILS-1, ILS-2, and ILS-3) each including an atomic group containing a sulfonic acid anion (—$SO_3$—). Such a composite ionic liquid does not lose the characteristic that the anodizing ability can be exhibited from a lower voltage region than that of an aqueous adipic acid electrolyte solution. Namely, the composite electrolyte has the excellent film repairing ability from a low voltage region and exhibits the excellent withstand voltage property in a high voltage region. This method can be widely applied to ionic liquids, for controlling the oxide film formation properties thereof.

Examples 28 to 44

An electrolytic capacitor was experimentally produced using a conductive polymer formed on an aluminum oxide film by electrolytic polymerization, and each of the ionic liquids was added to the electrolytic capacitor to measure the capacitor characteristics.

Namely, an aluminum foil (aluminum etched foil) of 7 mm in length and 10 mm in width was immersed in a 3% aqueous solution of ammonium adipate, the aluminum foil being provided with an anode lead and having pores which were formed in the surface by etching. Then, anodization was performed at 70° C. with a voltage of 70 V applied to form an oxide film as a dielectric film on the surface of the aluminum foil. Next, the aluminum foil was immersed in a 30% aqueous solution of manganese nitrate, naturally dried, and then subjected to pyrolysis at 300° C. for 30 minutes to form a conductive layer including a manganese oxide layer on the dielectric film.

Figure 4:
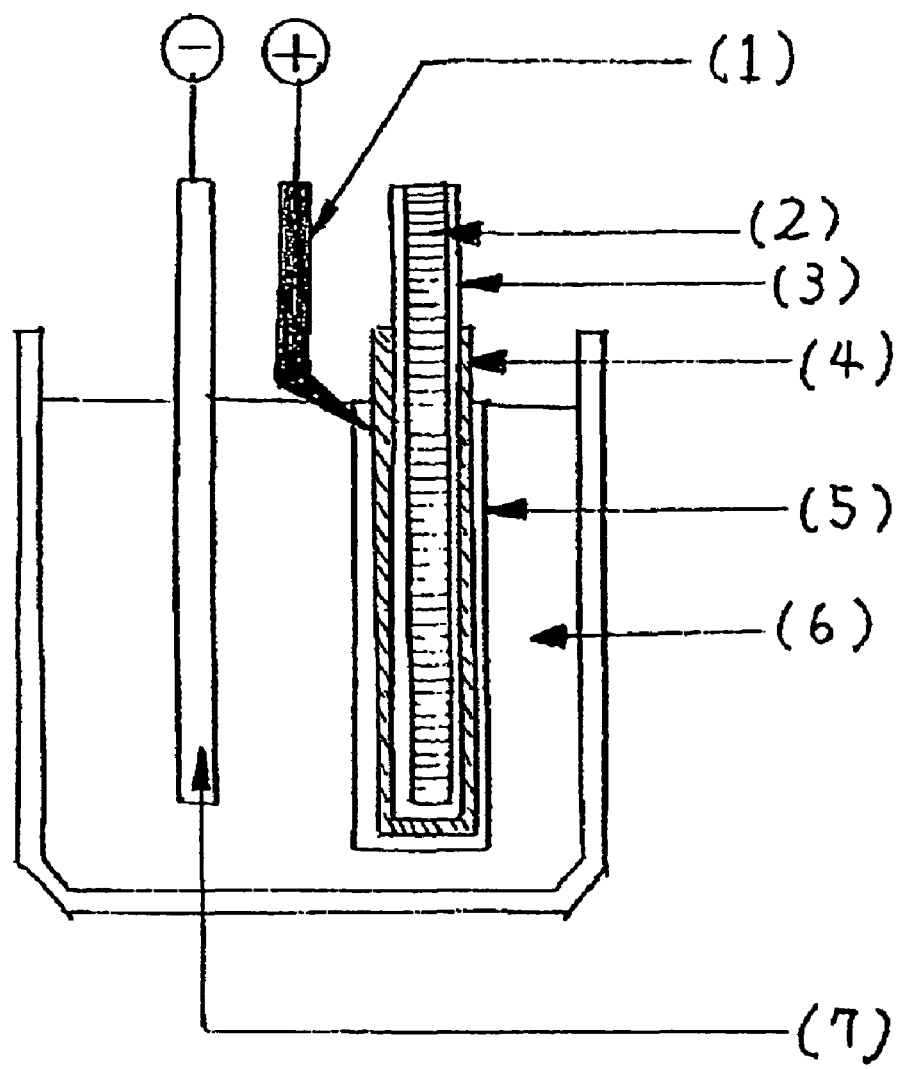
FIG. 4 is a conceptual drawing of an electrolytic polymerization apparatus for a conductive polymer.

Next, a polypyrrole layer was formed on the foil by electrolytic polymerization. FIG. 4 is a conceptual view of the apparatus used. An electrolytic solution (6) used for polymerization contained pyrrole (0.5 M), a 30% alcohol solution of sodium triisopropylnaphthalenesulfonate (0.1 M), and water. As shown in FIG. 4, an aluminum foil (2) was disposed in an electrolytic polymerization solution, and a polymerization initiation electrode (1) was brought near to a manganese dioxide conductive layer (4). Then, a constant voltage of 1.5 V was applied across the polymerization initiation electrode (1) and a cathode (7) for 50 minutes to perform electrolytic polymerization reaction. As a result, an electrolytically polymerized polypyrrole layer (5) was formed on the conductive layer.

Then, the aluminum foil was washed with water, dried, immersed in a methanol solution of each ionic liquid, and then dried to remove methanol. By the above-described method, the ionic liquid was added to the electrolytically polymerized polypyrrole layer to obtain an electrolyte of the present invention. The amount of each ionic liquid added was 0.5 to 5% by weight of the conductive polymer. Next, a carbon layer and a silver paste layer were provided on the electrolyte of the present invention to prepare a capacitor. The resultant capacitor of the present invention was aged at 20 V for 1 hour, and then the initial capacitance, tan δ, impedance (120 Hz), and withstand voltage (V) were measured.

Table 4 shows the characteristics of the resultant capacitors. The initial capacitance, tan δ, and impedance were not so different from those of Comparative Example 4 in which the ionic liquid was not added, but the withstand voltages were significantly improved. It was thus found that improvement in the withstand voltage of an electrolytic capacitor can be realized by applying the electrolyte of the present invention to the electrolytic capacitor, the electrolyte being prepared by adding an ionic liquid to a conductive polymer.

TABLE 4

Initial properties of capacitor: aluminum/oxide film/(polypyrrole + ionic liquid) system

| Experiment No. | Ionic liquid added | Capacitance (µF) | tanδ (%) | Impedance (mΩ) | Withstand voltage (V) |
|---|---|---|---|---|---|
| Example 28 | ILS-1 | 4.6 | 1.2 | 95 | 28 |
| Example 29 | ILS-2 | 4.5 | 1.2 | 95 | 27 |
| Example 30 | ILS-3 | 4.8 | 1.2 | 90 | 26 |
| Example 31 | ILS-4 | 4.6 | 1.2 | 92 | 25 |
| Example 32 | ILS-5 | 4.8 | 1.1 | 92 | 25 |
| Example 33 | ILS-6 | 4.7 | 1.3 | 95 | 28 |
| Example 34 | ILS-7 | 4.7 | 1.2 | 95 | 38 |
| Example 35 | ILS-8 | 4.6 | 1.2 | 98 | 32 |
| Example 36 | ILS-9 | 4.7 | 1.3 | 98 | 35 |
| Example 37 | ILS-10 | 4.6 | 1.3 | 99 | 34 |
| Example 38 | ILS-11 | 4.7 | 1.4 | 102 | 34 |
| Example 39 | ILS-12 | 4.5 | 1.4 | 98 | 38 |
| Example 40 | ILS-13 | 4.7 | 1.2 | 95 | 28 |
| Example 41 | ILS-14 | 4.8 | 1.1 | 88 | 25 |
| Example 42 | ILS-15 | 4.7 | 1.1 | 90 | 24 |
| Example 43 | ILS-16 | 4.8 | 1.2 | 92 | 24 |
| Example 44 | ILS-17 | 4.6 | 1.1 | 98 | 28 |
| Comparative Example 4 | No | 4.8 | 1.1 | 90 | 16 |

In particular, significant improvement in the withstand voltage was observed with the fluorine anion-containing ionic liquids (ILS-7 to 12).

Examples 45 to 48

A capacitor was prepared by the same method as in Examples 28 to 44 except that in preparing a film by electrolytic polymerization, an electrolytic solution having a composition including methoxyphenol (0.15 M), pyrrole (0.5 M), an alcohol solution of sodium triisopropylnaphthalenesulfonate (0.1 M), and water was used in place of the electrolytic solution including pyrrole (0.5 M), a 30% alcohol solution of sodium triisopropylnaphthalenesulfonate (0.1 M), and water. The characteristics of the resultant capacitors are shown in Table 5.

TABLE 5

Initial properties of capacitor: aluminum/oxide film/(polypyrrole + ionic liquid) system

| Experiment No. | Ionic liquid added | Capacitance (µF) | tanδ (%) | Impedance (mΩ) | Withstand voltage (V) |
|---|---|---|---|---|---|
| Example 45 | ILS-18 | 4.8 | 1.2 | 93 | 25 |
| Example 46 | ILS-19 | 4.6 | 1.2 | 88 | 26 |
| Example 47 | ILS-20 | 4.6 | 1.2 | 92 | 23 |
| Example 48 | ILS-21 | 4.7 | 1.3 | 100 | 17 |
| Comparative Example 4 | No | 4.8 | 1.1 | 90 | 16 |
| Comparative Example 5 | ILS-22 | 4.6 | 2.4 | 890 | 0.4 |
| Comparative Example 6 | ILS-23 | 4.6 | 3.1 | 900 | 0.4 |

With ILS-18 to 20, the initial capacitance, tan δ, and impedance were not so different from those of Comparative Example 4 in which the ionic liquid was not added, but the withstand voltages were significantly improved. It was thus found that improvement in the withstand voltage of a capacitor can be realized by adding an ionic liquid. While with ILS-21, substantially no influence on the capacitor characteristics was observed, and the withstand voltage was not greatly improved. This is possibly due to the fact that ILS-21 has substantially no anodizing ability or the very low anodizing ability.

Comparative Example 5 and 6

An aluminum electrolytic capacitor was experimentally produced by electrolytic polymerization according to the same procedures as in Example 45. Each of the ionic liquids ILS-22 and ILS-23 was added to the resultant electrolytic capacitor, and the capacitor characteristics were measured. The characteristics of the capacitors are shown in Table 1. It was found that when an ionic liquid containing chlorine or bromine is added, the capacitor characteristics are significantly degraded.

Examples 49 to 65

A conductive polymer electrolytic capacitor was produced using a conductive polymer formed on a tantalum oxide film by chemical polymerization. Each of the ionic liquids was added to the resultant capacitor, and the capacitor characteristics were measured.

Namely, a rectangular parallelepiped tantalum sintered compact (2 mm in length, 1.5 mm in height, and 1 mm in width) provided with an anode lead was subjected to anodization at 85° C. for 60 minutes with a voltage of 33.9 V applied in a 0.05% aqueous phosphoric acid solution to form an oxide film as a dielectric film on the tantalum sintered compact, thereby preparing a sample.

The sample was immersed in a 0.75 mol/l aqueous solution of pyrrole for 2 minutes and then immersed in a 0.1 mol/l aqueous ferric sulfate solution for 10 minutes. This operation was repeated about 20 times to cover the entire surface of the sample with polypyrrole by chemical polymerization. Then, the sample was washed with water, dried, immersed in a methanol solution of an ionic liquid, and then dried to remove methanol. By the above-described method, each ionic liquid was added to the chemically polymerized polypyrrole layer to obtain an electrolyte of the present invention. The amount of the ionic liquid added was 0.5 to 5% by weight of the conductive polymer. Next, a carbon layer and a silver paste layer were provided on the electrolyte of the present invention to prepare a capacitor. Then, a cathode lead was provided on the silver paste layer, and the resultant capacitor of the present invention was aged at an applied voltage of 12.5 V for 1 hour. Next, the capacitor was armored with a resin to prepare an electrolytic capacitor. The thus-prepared capacitor of the present invention was aged at 20 V for 1 hour. Then, the initial capacitance, tan δ, leakage current, and withstand voltage (V) were measured.

Table 6 shows the characteristics of the resultant capacitors. The initial capacitance and tan δ were not so different from those of the comparative example in which the ionic liquid was not added, but the leakage currents and the withstand voltages were significantly improved. It was thus found that improvement in the withstand voltage of an electrolytic capacitor can be realized by applying the electrolyte of the present invention to the electrolytic capacitor, the electrolyte being prepared by adding an ionic liquid to a conductive polymer.

TABLE 6

Initial properties of capacitor: tantalum/oxide film/(polypyrrole + ionic liquid) system

| Experiment No. | Ionic liquid added | Capacitance (µF) | tanδ (%) | Leakage current (µA) | Withstand voltage (V) |
|---|---|---|---|---|---|
| Example 49 | ILS-1 | 16.7 | 1.6 | 0.13 | 18 |
| Example 50 | ILS-2 | 16.2 | 1.7 | 0.16 | 16 |
| Example 51 | ILS-3 | 17.0 | 1.8 | 0.12 | 18 |
| Example 52 | ILS-4 | 17.7 | 2.0 | 0.08 | 16 |
| Example 53 | ILS-5 | 16.6 | 1.7 | 0.10 | 16 |
| Example 54 | ILS-6 | 16.5 | 2.0 | 0.12 | 16 |
| Example 55 | ILS-7 | 17.0 | 1.9 | 0.08 | 30 |
| Example 56 | ILS-8 | 16.8 | 1.8 | 0.09 | 20 |
| Example 57 | ILS-9 | 17.0 | 1.9 | 0.12 | 26 |
| Example 58 | ILS-10 | 16.6 | 2.0 | 0.08 | 30 |
| Example 59 | ILS-11 | 16.4 | 2.0 | 0.08 | 30 |
| Example 60 | ILS-12 | 16.5 | 2.0 | 0.13 | 28 |
| Example 61 | ILS-13 | 16.9 | 1.8 | 0.12 | 16 |
| Example 62 | ILS-14 | 16.8 | 1.8 | 0.09 | 16 |
| Example 63 | ILS-15 | 17.5 | 1.7 | 0.12 | 16 |
| Example 64 | ILS-16 | 17.0 | 1.8 | 0.08 | 20 |
| Example 65 | ILS-17 | 16.5 | 2.0 | 0.13 | 20 |
| Comparative Example 7 | No | 17.2 | 1.8 | 0.18 | 12 |

In particular, with the fluorine anion-containing ionic liquids (ILS-7 to 12), significant improvements in the withstand voltages were observed. It was thus found that the ionic liquid of the present invention is effective in forming an oxide film on a tantalum metal surface and repairing the oxide film.

Examples 66 to 82

A conductive polymer aluminum electrolytic capacitor (aluminum electrolytic capacitor) was prepared using a conductive polymer formed on an aluminum oxide film by chemical polymerization of thiophene.

In other words, an aluminum etched foil of 4×3.3 mm was immersed in a 3% aqueous solution of ammonium adipate. Next, the voltage was increased from 0 V to 10 V at a rate of 10 mV/sec, and a constant voltage of 10 V was applied for 40 minutes to form a dielectric film on the aluminum etched foil. Next, the foil was washed with flowing deionized water for 10 minutes and then dried at 105° C. for 5 minutes. The capacitance of the resultant aluminum etched foil in the solution was 18 µF.

Next, an ethanol solution containing ferric benzenesulfonate which was a transition metal salt including benzenesulfonic acid anion and ferric triisopropylnaphthalenesulfonate which was a transition metal salt including triisopropylnaphthalenesulfonic acid anion was prepared as an oxidizing agent. Next, 1,4-dioxythiophene was mixed with the oxidizing agent, and the resultant mixture was stirred to prepare a polymerization solution. The aluminum foil anodized as described above was immersed in the solution, heated in an electric furnace at 105° C. for 5 seconds, further heated in an electric furnace at 70° C. for 10 minutes to progress chemical polymerization, washed with deionized water, and then dried. This operation was repeated ten or more times so that the foil was entirely covered with polythiophene as viewed with the eyes. After washing and drying, each of the ionic liquids was added by the same method as in Example 28.

(Namely, as described above, a polythiophene layer was formed on a conductive layer by electrolytic polymerization, washed with water, dried, immersed in a methanol solution of each ionic liquid, and then dried to remove methanol. By this method, the ionic liquid was added to the electrolytically polymerized polypyrrole layer to prepare an electrolyte of the present invention. The amount of the ionic liquid added was 0.5 to 5% by weight.) Then, a carbon layer and a silver paste layer were provided on the electrolyte of the present invention to prepare a capacitor. The characteristics of the resultant capacitors are shown in Table 7.

TABLE 7

Initial properties of capacitor: aluminum/oxide film/(polythiophene + ionic liquid) system

| Experiment No. | Ionic liquid added | Capacitance (µF) | tanδ (%) | Leakage current (µA) | Withstand voltage (V) |
|---|---|---|---|---|---|
| Example 66 | ILS-1 | 15.0 | 2.1 | 0.03 | 6 |
| Example 67 | ILS-2 | 16.1 | 1.8 | 0.06 | 8 |
| Example 68 | ILS-3 | 15.0 | 2.4 | 0.10 | 8 |
| Example 69 | ILS-4 | 15.0 | 2.0 | 0.04 | 8 |
| Example 70 | ILS-5 | 15.2 | 1.9 | 0.08 | 8 |
| Example 71 | ILS-6 | 15.0 | 1.7 | 0.08 | 10 |
| Example 72 | ILS-7 | 15.0 | 1.8 | 0.04 | 10 |
| Example 73 | ILS-8 | 15.0 | 2.2 | 0.09 | 8 |
| Example 74 | ILS-9 | 14.9 | 2.0 | 0.04 | 10 |
| Example 75 | ILS-10 | 15.2 | 1.7 | 0.06 | 10 |
| Example 76 | ILS-11 | 15.2 | 1.5 | 0.05 | 10 |
| Example 77 | ILS-12 | 15.0 | 1.8 | 0.06 | 10 |
| Example 78 | ILS-13 | 15.9 | 2.1 | 0.14 | 8 |
| Example 79 | ILS-14 | 15.0 | 2.2 | 0.09 | 6 |
| Example 80 | ILS-15 | 15.5 | 2.2 | 0.11 | 8 |
| Example 81 | ILS-16 | 15.0 | 2.8 | 0.08 | 8 |
| Example 82 | ILS-17 | 14.9 | 2.6 | 0.10 | 9 |
| Comparative Example 8 | No | 15.2 | 2.0 | 0.28 | 4 |

The initial capacitance and tan δ were not so different from those of the comparative example in which the ionic liquid was not added, but the leakage currents and the withstand voltages were significantly improved. It was thus found that improvement in the characteristics of an electrolytic capacitor can be realized by applying the electrolyte of the present invention to the electrolytic capacitor, the electrolyte being prepared by adding an ionic liquid to a conductive polymer. In particular, with the fluorine anion-containing ionic liquids (ILS-7 to 12), significant improvements in the withstand voltages were observed, and a withstand voltage of 10 V corresponding to the initial formation voltage was obtained.

Examples 83 to 87

The characteristics of a capacitor were evaluated using a system containing the ionic liquid (ILS-2) and each of the solutes below at a weight ratio of 2:1. As the solutes added, the commercially available solutes below were used.

First, a methanol solution containing each of the solutes below and ILS-2 at the above-described weight ratio was prepared, and a capacitor was produced by the same method as in Examples 28 to 44. Namely, instead of the step of immersing in the ILS-2 methanol solution in Example 29, the step of immersing in an ILS-2 methanol solution containing each solute was performed.

The characteristics of the resultant capacitors are shown in Table 8.

TABLE 8

Initial properties of capacitor: aluminum/oxide film/(polypyrrole + ionic liquid + solute) system

| Experiment No. | Ionic liquid added + solute added | Capacitance (µF) | tanδ (%) | Impedance (mΩ) | Withstand voltage (V) |
|---|---|---|---|---|---|
| Example 83 | ILS-2 + SA | 4.5 | 1.2 | 94 | 32 |
| Example 84 | ILS-2 + SB | 4.4 | 1.2 | 98 | 34 |
| Example 85 | ILS-2 + SC | 4.5 | 1.2 | 94 | 30 |
| Example 86 | ILS-2 + SD | 4.3 | 1.2 | 98 | 30 |
| Example 87 | ILS-2 + SE | 4.6 | 1.3 | 94 | 32 |

Hereinafter, SA to SH each represent the solute. In Examples 83 to 87, solutes SA to SE were used respectively. However, solutes SF to SH were used in subsequent examples and comparative examples, respectively.

Ammonium adipate (Diammonium adipate=$(NH_4)^+$ ($^-OOC-(CH_2)_4-COO^-$) $(NH_4)^+$, abbreviated as "SA")

Triethylamine maleate (Triethylammonium hydrogen maleate=$((C_2H_5)_3N-H)^+(HOOC-CH=CH-COO)^-$, abbreviated as "SB")

Tetraethylammonium maleate (Triethylammonium hydrogen maleate=$((C_2H_5)_4N)^+(HOOC-CH=CH-COO)^-$, abbreviated as "SC")

Tetraethylammonium phthalate $(((C_2H_5)_4N)^+(HOOC-C_6H_4-COO)^-$, abbreviated as "SD")

Tetraethylammonium benzoate $(((C_2H_5)_4N)^+(C_6H_5-COO)^-$, abbreviated as "SE")

Triethylmethylammonium maleate (Triethylmethylammonium hydrogen maleate=$((C_2H_5)_3N-CH_3)^+(HOOC-CH=CH-COO)^-$, abbreviated as "SF")

Triethylmethylammonium phthalate (Triethylmethylammonium hydrogen phthalate=$((C_2H_5)_3N-CH_3)^+$(1-$HOOC-C_6H_4$-2-$COO)^-$, abbreviated as "SG")

Phosphoric acid ($H_3PO_4$, abbreviated as "SH")

Table 8 indicates that when an electrolyte of the present invention prepared by adding an ionic liquid containing such a solute to a conductive polymer is applied to an electrolytic capacitor, the withstand voltage of the capacitor can be further improved.

Examples 88 to 91

Table 9 shows the characteristics of capacitors prepared by the same method as in Examples 28 to 44 except the conditions (1) and (2) below.

TABLE 9

Initial properties of capacitor: aluminum/oxide film/(polypyrrole + ionic liquid + solute) system

| Experiment No. | Ionic liquid added + solute added | Capacitance (µF) | tanδ (%) | Impedance (mΩ) | Withstand voltage (V) |
|---|---|---|---|---|---|
| Example 88 | ILS-18 + SA | 4.8 | 1.1 | 92 | 27 |
| Example 89 | ILS-19 + SA | 4.7 | 1.2 | 88 | 28 |
| Example 90 | ILS-20 + SA | 4.6 | 1.2 | 92 | 23 |
| Example 91 | ILS-21 + SA | 4.7 | 1.3 | 96 | 22 |
| Example 92 | ILS-18 + SB | 4.6 | 1.3 | 96 | 24 |
| Example 93 | ILS-18 + SF | 4.7 | 1.2 | 93 | 26 |
| Example 94 | ILS-18 + SG | 4.8 | 1.2 | 95 | 25 |
| Comparative Example 4 | No | 4.8 | 1.1 | 90 | 16 |
| Comparative Example 9 | ILS-22 + SA | 4.7 | 1.8 | 390 | 4 |
| Comparative Example 10 | ILS-23 + SA | 4.6 | 2.0 | 595 | 3 |

(1) The ionic liquids ILS-18 to 21 were used, and any one of the solutes below was added to each of the ionic liquids (ILS-18 to 21) at a weight ratio of 85:15 (the content of solute SA in the ionic liquid was 15%). In other words, in the process for producing a capacitor in each of Examples 28 to 44, the step of immersing in each of ILS-18 to 21 methanol solutions each containing the solute was performed instead of the step of immersing in the ILS-1 methanol solution in Example 28.

(2) In preparing a film by electrolytic polymerization, an electrolyte including methoxyphenol (0.15 M), pyrrole (0.5 M), an alcohol solution of sodium triisopropylnaphthalenesulfonate (0.1 M), and water was used instead of the electrolyte including pyrrole (0.5 M), a 30% alcohol solution of sodium triisopropylnaphthalenesulfonate (0.1 M), and water.

The characteristics of the resultant capacitors are shown in Table 9. The initial capacitance, tan δ, impedance value were not so different from those of Comparative Example 4 in which the ionic liquid was not added, but the withstand voltages were significantly improved. It was thus found that improvement in the withstand voltage of a capacitor can be realized by adding the ionic liquid.

Examples 92 to 94

An aluminum electrolytic capacitor was prepared by electrolytic polymerization according to the same procedures as in Example 88. A solution of the ionic liquid ILS-18 and 15% of each of the solutes SB, SF, and SG was added to the resultant electrolytic capacitor, and the capacitor characteristics were measured. The results of the capacitor characteristics are shown in a lower part of Table 9. The initial capacitance, tan δ, impedance value were not so different from those of Comparative Example 4 in which the ionic liquid was not added, but the withstand voltages were significantly improved. It was thus found that improvement in the withstand voltage of a capacitor can be realized regardless of the type of the solute added to the ionic liquid.

Comparative Examples 9 and 10

The characteristics of a capacitor were measured using each of the ionic liquids ILS-22 and 23 (in which 15% of SA was dissolved) by the same method as in Examples 88 to 91. The results are shown in Table 9. The results indicate that both the tan δ and the withstand voltage are significantly degraded. This is possibly due to bromine or chlorine present in the ionic liquid.

Examples 95 to 98

A tantalum conductive polymer electrolytic capacitor was prepared by chemical polymerization, and each of the ionic liquids ILS-18 to 21 (in which 15% of solute SA was dissolved) was added to the electrolytic capacitor. The capacitor characteristics were measured.

Namely, a rectangular parallelepiped tantalum sintered compact (2 mm in length, 1.5 mm in height, and 1 mm in width) provided with an anode lead was subjected to anodization in a 0.05% aqueous phosphoric acid solution at 85° C. for 60 minutes with a voltage of 33.9 V applied to form a dielectric film. The resultant element was immersed in a 0.75 mol/l aqueous solution of pyrrole for 2 minutes and then immersed in a 0.1 mol/l aqueous solution of ferric sulfate for 10 minutes. This operation was repeated about 20 times to cover the entirety of the element with a conductive polypyrrole polymer by chemical oxidation polymerization. Next, the ionic liquid was added by the same method as in Example 45.

Next, a carbon paste film and a silver paste film were formed by an ordinary method, and a cathode is provided on the silver paste film. The element was aged with a voltage of 12.5 V applied and armored with a resin to prepare an electrolytic capacitor. The resultant capacitor of the present invention was aged at 20 V for 1 hour, and then the initial capacitance, tan δ, leakage current, and the withstand voltage (V) were measured.

Table 10 shows the characteristics of the resultant capacitors. The initial capacitance and tan δ were not so different from those of Comparative Example 11 in which the ionic liquid was not added, but the leakage currents and the withstand voltages were significantly improved. It was thus found that improvement in the characteristics of a capacitor can be realized by adding the ionic liquid.

TABLE 10

| | Initial properties of capacitor: tantalum/oxide film/(polypyrrole + ionic liquid + solute) system | | | | |
|---|---|---|---|---|---|
| Experiment No. | Ionic liquid added | Capacitance (μF) | tan δ (%) | Leakage current (μA) | Withstand voltage (V) |
| Example 95 | ILS-18 + SA | 16.6 | 2.2 | 0.09 | 19 |
| Example 96 | ILS-19 + SA | 16.2 | 2.2 | 0.19 | 18 |
| Example 97 | ILS-20 + SA | 16.4 | 2.3 | 0.26 | 16 |
| Example 98 | ILS-21 + SA | 16.0 | 2.4 | 0.18 | 16 |
| Comparative Example 11 | No | 17.2 | 2.0 | 0.18 | 12 |

Examples 99 to 102

A conductive polymer aluminum electrolytic capacitor was prepared by chemical polymerization of thiophene, and each of the ionic liquids ILS-18 to 20 (in which 15% of solute SA was dissolved) was added to the resultant electrolytic capacitor. The characteristics of the resultant capacitors were measured.

Namely, an aluminum etched foil of 4×3.3 mm was immersed in a 3% aqueous solution of ammonium adipate. Next, the voltage was increased from 0 V to 10 V at a rate of 10 mV/sec, and a constant voltage of 10 V was applied for 40 minutes to form a dielectric film on the aluminum etched foil. Next, the foil was washed with flowing deionized water for 10 minutes and then dried at 105° C. for 5 minutes. The capacitance of the resultant aluminum etched foil in the solution was 18 μF.

Next, an ethanol solution containing ferric benzenesulfonate which was a transition metal salt including benzenesulfonic acid anion and ferric triisopropylnaphthalenesulfonate which was a transition metal salt including triisopropylnaphthalenesulfonic acid anion was prepared as an oxidizing agent. Next, 1,4-dioxythiophene was mixed with the oxidizing agent, and the resultant mixture was stirred to prepare a polymerization solution. The aluminum foil anodized as described above was immersed in the solution, heated in an electric furnace at 105° C. for 5 seconds, further heated in an electric furnace at 70° C. for 10 minutes to allow chemical polymerization to proceed, washed with deionized water, and then dried. This operation was repeated so that the aluminum foil was entirely covered with polythiophene. After washing and drying, each ionic liquid was added by the same method as in Example 1. Then, a cathode was formed using carbon paste and silver paste to prepare a capacitor.

The characteristics of the resultant capacitors are shown in Table 11. The initial capacitance and tan δ were not so different from those of Comparative Example 12 in which the ionic liquid was not added, but the leakage currents and the withstand voltages were significantly improved. It was thus found that improvement in the characteristics of a capacitor can be realized by adding the ionic liquid.

TABLE 11

Initial properties of capacitor: aluminum/oxide film/(polythiophene + ionic liquid + solute) system

| Experiment No. | Ionic liquid added | Capacitance (μF) | tanδ (%) | Leakage current (μA) | Withstand voltage (V) |
|---|---|---|---|---|---|
| Example 99 | ILS-18 + SA | 15.0 | 2.2 | 0.09 | 8 |
| Example 100 | ILS-19 + SA | 14.8 | 2.2 | 0.15 | 9 |
| Example 101 | ILS-20 + SA | 14.6 | 2.3 | 0.16 | 7 |
| Example 102 | ILS-21 + SA | 14.5 | 1.7 | 0.06 | 6 |
| Comparative Example 12 | No | 15.2 | 2.0 | 0.28 | 4 |

Examples 103 to 119

An electrolytic capacitor was experimentally prepared using a TCNQ salt formed on an aluminum oxide film by melting impregnation, and each ionic liquid was added to the resultant electrolytic capacitor. The characteristics of the capacitors were measured.

Namely, an aluminum foil etched at a high surface magnification was immersed in a 3% aqueous solution of ammonium adipate and subjected to anodization at 70° C. with a voltage of 50 V applied to form an oxide film as a dielectric film on the surface of the aluminum foil. The aluminum foil was used as an anode foil/cathode foil, and a lead wire was attached thereto. Then, the foil was coiled through Manila hemp paper used as a separator to form a coiled capacitor element. Next, in order to facilitate impregnation of the molten TCNQ salt, the capacitor element was heated to carbonize the separator paper.

Next, an armoring aluminum case was filled with an N-n-butylisoquinolinium (TCNQ)$_2$ salt and each ionic liquid (2%), followed by melting at 210° C. Then, the pre-heated capacitor element was placed in the case, and the aluminum case was cooled with liquid nitrogen immediately after the element was placed in the case.

Next, an epoxy resin was injected into an upper portion of the case and then heat-cured to seal the case. The thus-prepared capacitor of the present invention was aged at 20 V for 1 hour, and then the initial voltage, tan δ, impedance (120 Hz), and the withstand voltage (V) were measured. The withstand voltage was measured as a voltage at which the leakage current started to increase with increases in the voltage at a constant rate. Since measurement of the withstand voltage produced a large error, the measured values of ten or more elements were averaged to determine the withstand voltage. The characteristics of the resultant capacitors are shown in Table 12. The ionic liquids used were ILS-1 to 17.

TABLE 12

Initial properties of capacitor: aluminum/oxide film/(N-n-butylisoquinolinium (TCNQ)2 salt + ionic liquid) system

| Experiment No. | Ionic liquid added | Capacitance (μF) | tanδ (%) | Impedance (mΩ) | Withstand voltage (V) |
|---|---|---|---|---|---|
| Example 103 | ILS-1 | 6.6 | 2.2 | 98 | 28 |
| Example 104 | ILS-2 | 6.5 | 2.2 | 97 | 27 |
| Example 105 | ILS-3 | 6.8 | 2.2 | 92 | 26 |
| Example 106 | ILS-4 | 6.6 | 2.2 | 92 | 25 |
| Example 107 | ILS-5 | 6.8 | 2.1 | 90 | 25 |
| Example 108 | ILS-6 | 6.7 | 2.2 | 93 | 26 |
| Example 109 | ILS-7 | 6.7 | 2.2 | 98 | 38 |
| Example 110 | ILS-8 | 6.8 | 2.1 | 90 | 25 |
| Example 111 | ILS-9 | 6.7 | 2.3 | 89 | 38 |
| Example 112 | ILS-10 | 6.9 | 2.1 | 92 | 44 |
| Example 113 | ILS-11 | 6.8 | 2.2 | 105 | 42 |
| Example 114 | ILS-12 | 6.7 | 2.3 | 102 | 38 |
| Example 115 | ILS-13 | 6.7 | 2.2 | 98 | 28 |
| Example 116 | ILS-14 | 6.8 | 2.1 | 90 | 25 |
| Example 117 | ILS-15 | 6.7 | 2.1 | 89 | 24 |
| Example 118 | ILS-16 | 6.8 | 2.2 | 95 | 24 |
| Example 119 | ILS-17 | 6.6 | 2.1 | 109 | 28 |
| Comparative Example 13 | No | 6.9 | 2.1 | 82 | 18 |

The initial capacitance, tan δ, and impedance value were not so different from those of Comparative Example 13 in which the ionic liquid was not added, but the withstand voltages were significantly improved. It was thus found that improvement in the withstand voltage of an electrolytic capacitor can be realized by applying the electrolyte of the present invention to the electrolytic capacitor, the electrolyte being prepared by adding an ionic liquid to a TCNQ salt.

Examples 120 to 123

An aluminum electrolytic capacitor was experimentally prepared using a TCNQ salt electrolyte formed by melting impregnation according to the same procedures as in Examples 103 to 119. Then, each of the ionic liquids ILS-18 to 21 was added to the resultant electrolytic capacitor, and the characteristics of the capacitors were measured.

The characteristics of the resultant capacitors are shown in table 13.

TABLE 13

Initial properties of capacitor: aluminum/oxide film/(N-n-butylisoquinolinium (TCNQ)2 salt + ionic liquid) system

| Experiment No. | Ionic liquid added | Capacitance (μF) | tanδ (%) | Impedance (mΩ) | Withstand voltage (V) |
|---|---|---|---|---|---|
| Example 120 | ILS-18 | 6.8 | 2.2 | 90 | 25 |
| Example 121 | ILS-19 | 6.7 | 2.2 | 98 | 28 |
| Example 122 | ILS-20 | 6.7 | 2.3 | 92 | 19 |
| Example 123 | ILS-21 | 6.4 | 2.5 | 97 | 17 |
| Comparative Example 14 | No | 6.8 | 2.1 | 92 | 16 |
| Comparative Example 15 | ILS-22 | 7.6 | 3.4 | 870 | 0.1 |
| Comparative Example 16 | ILS-23 | 6.3 | 4.4 | 1700 | 0.2 |

With the hydrophilic ionic liquids ILS-18 and 19, the initial capacitance, tan δ, and impedance value were not so different from those of Comparative Example 14 in which the ionic liquid was not added (TCNQ salt was used as an electrolyte), but the withstand voltage was significantly improved. It was thus found that improvement in the withstand voltage of a capacitor can be realized by adding the ionic liquid.

On the other hand, with the hydrophobic liquids ILS-20 and 21, substantially no influence on the capacitor characteristics was observed, and the withstand voltage was slightly improved. This is possibly due to the low anodizing ability of the ILS-21 and 20.

Comparative Examples 15 and 16

Each of ILS-22 and 23 was added by the same method as in Example 120, and the capacitor characteristics were measured. The results of measurement are shown in a lower part of Table 13. It was found that when a chlorine- or bromine-containing ionic liquid is added, the capacitor characteristics are significantly degraded.

Examples 124 to 131

An electrolytic capacitor was produced by the same method as in Example 103 except that N-isoamylisoquinolinium $(TCNQ)_2$ salt was used in place of N-n-butylisoquinolinium $(TCNQ)_2$ salt. The melting impregnation temperature was 215° C. The characteristics of the resultant capacitors are shown in Table 14. In the experiment, the ionic liquids ILS-1 to 5, 10, 13, and 14 were used.

TABLE 14

Initial properties of capacitor: aluminum/oxide film/(N-n-isoamylisoquinolinium (TCNQ)2 salt + ionic liquid) system

| Experiment No. | Ionic liquid added | Capacitance (μF) | tanδ (%) | Impedance (mΩ) | Withstand voltage (V) |
|---|---|---|---|---|---|
| Example 124 | ILS-1 | 6.8 | 2.6 | 102 | 26 |
| Example 125 | ILS-2 | 7.6 | 2.8 | 104 | 26 |
| Example 126 | ILS-3 | 7.2 | 3.4 | 98 | 28 |
| Example 127 | ILS-4 | 7.2 | 3.4 | 98 | 28 |
| Example 128 | ILS-5 | 6.8 | 2.6 | 102 | 26 |
| Example 129 | ILS-10 | 7.2 | 2.9 | 104 | 36 |
| Example 130 | ILS-13 | 7.6 | 2.8 | 104 | 26 |
| Example 131 | ILS-14 | 6.6 | 2.5 | 94 | 25 |
| Comparative Example 17 | | 7.8 | 2.4 | 90 | 18 |

The initial capacitance, tan δ, and impedance value were not so different from those of the comparative example in which the ionic liquid was not added, but the withstand voltages were significantly improved. It was thus found that improvement in the withstand voltage of an electrolytic capacitor can be realized by applying the electrolyte of the present invention, which contains the ionic liquid, to the electrolytic capacitor regardless of the type of the TCNQ salt used.

Examples 132 to 135

A TCNQ salt electrolyte was formed by adding 2% of each of the ionic liquids ILS-18 to 21 by melting impregnation, and an aluminum electrolytic capacitor was experimentally produced by the same method as in Example 103 except that N-isoamylisoquinolinium $(TCNQ)_2$ salt was used in place of N-n-butylisoquinolinium $(TCNQ)_2$ salt as in Examples 124 to 131. The characteristics of the capacitors were measured. In this experiment, the N-isoamylisoquinolinium $(TCNQ)_2$ salt (salt B) was molten and impregnated at 215° C. The characteristics of the resultant capacitors are shown in Table 15.

TABLE 15

Initial properties of capacitor: aluminum/oxide film/(N-n-isoamylisoquinoliniumbutylisoquinolinium (TCNQ)2 salt + ionic liquid) system

| Experiment No. | Ionic liquid added | Capacitance (μF) | tanδ (%) | Impedance (mΩ) | Withstand voltage (V) |
|---|---|---|---|---|---|
| Example 132 | ILS-18 | 6.8 | 2.5 | 90 | 27 |
| Example 133 | ILS-19 | 6.4 | 2.2 | 95 | 29 |
| Example 134 | ILS-20 | 6.6 | 2.3 | 98 | 20 |
| Example 135 | ILS-21 | 6.2 | 2.3 | 106 | 18 |

With the hydrophilic ionic liquids ILS-18 and 19, the initial capacitance, tan δ, and impedance value were not so different from those of Comparative Example 17 in which the ionic liquid was not added, but the withstand voltages were significantly improved. It was thus found that improvement in the withstand voltage of a capacitor can be realized by adding the ionic liquid. On the other hand, with the hydrophobic liquids ILS-20 and 21, substantially no influence on the capacitor characteristics was observed, and the withstand voltages were slightly improved. This is possibly due to the low anodizing ability of the ILS-21 and 20 as compared with the ILS-18 and 19.

Examples 136 to 140

Each of the solutes (SA to SE) was added to the ionic liquid (ILS-2) so that the weight ratio between the ionic liquid and the solute was 4:1 (the content of solute SA dissolved in the ionic liquid was 20%). A capacitor was produced by the same method as in Example 103. The characteristics of the resultant capacitors are shown in Table 16.

TABLE 16

Initial properties of capacitor: aluminum/oxide film/ (N-n-butylisoquinolinium (TCNQ)2 salt + ionic liquid + solute) system

| Experiment No. | Ionic liquid added + solute added | Capacitance (μF) | tanδ (%) | Impedance (mΩ) | Withstand voltage (V) |
|---|---|---|---|---|---|
| Example 136 | ILS-2 + SA | 6.5 | 3.2 | 96 | 33 |
| Example 137 | ILS-2 + SB | 6.0 | 3.8 | 97 | 30 |
| Example 138 | ILS-2 + SC | 5.5 | 3.7 | 104 | 28 |
| Example 139 | ILS-2 + SD | 5.8 | 3.5 | 96 | 30 |
| Example 140 | ILS-2 + SE | 5.7 | 3.0 | 108 | 32 |

The table indicates that when the electrolyte of the present invention, which is prepared by adding the ionic liquid containing such a solute to TCNQ salt, is applied to an electrolyte capacitor, the withstand voltage thereof can be further improved.

Examples 141 to 144

A TCNQ salt electrolyte was formed by adding 5% of each of the ionic liquids ILS-18 to 21 (in which 15% of solute SA was dissolved) by melting impregnation, and an aluminum electrolytic capacitor was experimentally produced by the same method as in Example 120. The characteristics of the capacitors were measured.

The characteristics of the resultant capacitors are shown in Table 17. The initial capacitance, tan δ, and impedance value were not so different from those of Comparative Example 17 in which the ionic liquid was not added, but the withstand voltages were significantly improved. It was thus found that improvement in the withstand voltage of a capacitor can be realized by adding the ionic liquid containing the solute dissolved therein.

TABLE 17

Initial properties of capacitor: aluminum/oxide film/ (N-n-butylisoquinolinium (TCNQ)2 salt + ionic liquid + solute) system

| Experiment No. | Ionic liquid added + solute added | Capacitance (μF) | tanδ (%) | Impedance (mΩ) | Withstand voltage (V) |
|---|---|---|---|---|---|
| Example 141 | ILS-18 + SA | 6.6 | 2.2 | 97 | 28 |
| Example 142 | ILS-19 + SA | 6.4 | 2.5 | 90 | 32 |
| Example 143 | ILS-20 + SA | 6.5 | 2.3 | 108 | 28 |
| Example 144 | ILS-21 + SA | 6.4 | 2.5 | 95 | 27 |

Examples 145 to 147

An aluminum electrolytic capacitor was experimentally produced by the same method as in Example 120, and a solution prepared by dissolving 15% of each of the solutes SB, SG, and SF to the ionic liquid ILS-18 was added to the electrolytic capacitor. The characteristics of the capacitors were measured. The characteristics of the resultant capacitors are shown in Table 18. The initial capacitance, tan δ, and impedance value were not so different from those of Comparative Example 17 in which the ionic liquid was not added, but the withstand voltage was significantly improved. It was thus found that improvement in the withstand voltage of a capacitor can be realized regardless of the type of the solute added to the ionic liquid.

TABLE 18

Initial properties of capacitor: aluminum/oxide film/ (N-n-butylisoquinolinium (TCNQ)2 salt + ionic liquid + solute) system

| Experiment No. | Ionic liquid added + solute added | Capacitance (μF) | tanδ (%) | Impedance (mΩ) | Withstand voltage (V) |
|---|---|---|---|---|---|
| Example 145 | ILS-18 + SF | 6.4 | 2.7 | 94 | 29 |
| Example 146 | ILS-18 + SG | 6.0 | 2.5 | 109 | 23 |
| Example 147 | ILS-18 + SB | 6.4 | 2.6 | 94 | 26 |

Examples 148 to 159

Experiments were conducted by changing the amount of the ionic liquid added by the same method as in Examples 28 and 37. The results are shown in Table 19.

TABLE 19

Initial properties of capacitor: aluminum/oxide film/(polypyrrole + ionic liquid) system, influence of amount of ionic liquid added

| | Ionic liquid added | | Initial properties | | | |
|---|---|---|---|---|---|---|
| | Ionic liquid | Adding amount (%) | Capacitance (μF) | tanδ (%) | Impedance (mΩ) | Withstand voltage (V) |
| Example 148 | ILS-1 | 0.01 | 4.7 | 1.1 | 92 | 20 |
| Example 149 | | 0.1 | 4.8 | 1.2 | 95 | 24 |
| Example 150 | | 2 | 4.6 | 1.2 | 95 | 28 |
| Example 151 | | 10 | 4.5 | 1.5 | 162 | 30 |
| Example 152 | | 20 | 4.3 | 1.9 | 390 | 38 |

TABLE 19-continued

Initial properties of capacitor: aluminum/oxide film/(polypyrrole + ionic liquid) system, influence of amount of ionic liquid added

| | Ionic liquid added | | Initial properties | | | |
|---|---|---|---|---|---|---|
| | Ionic liquid | Adding amount (%) | Capacitance (μF) | tanδ (%) | Impedance (mΩ) | Withstand voltage (V) |
| Example 153 | | 50 | 4.0 | 2.8 | >500 | 38 |
| Example 154 | ILS-10 | 0.01 | 4.7 | 1.1 | 95 | 22 |
| Example 155 | | 0.1 | 4.6 | 1.2 | 96 | 28 |
| Example 156 | | 2 | 4.6 | 1.3 | 99 | 34 |
| Example 157 | | 10 | 4.5 | 1.8 | 180 | 38 |
| Example 158 | | 20 | 4.4 | 2.4 | 470 | 42 |
| Example 159 | | 50 | 4.0 | 3.4 | >500 | 45 |
| Comparative Example 4 | No | | 4.8 | 1.1 | 90 | 16 |

The results indicate that even when the amount of the ionic liquid added to a conductive polymer (polypyrrole) is 0.01 part by weight relative to 100 parts by weight of the conductive polymer, there is the effect of improving the withstand voltage, and the effect is significant with the ionic liquid added in an amount of 0.1 part by weight or more. However, when the amount is 10 parts by weight or more, the impedance property is degraded, and the capacitance also tends to be decreased.

The same tendency applies to a case in which tantalum is used as an electrode, a case in which a conductive polymer such as a thiophene polymer other than a pyrrole polymer is used as the conductive polymer, and a case in which either of electrolytic polymerization and chemical polymerization is used. These results reveal that in an electrolyte including a conductive polymer and an ionic liquid, the amount of the ionic liquid added is most preferably in a range of 0.01% to less than 10% relative to 100% by weight of the conductive polymer.

Examples 160 to 169

Experiments were conducted using a TCNQ salt by the same method as in Examples 103 and 112 except that the amount of the ionic liquid added was changed to various values. The results are shown in Table 20.

TABLE 20

Initial properties of capacitor: aluminum/oxide film/(N-n-butylisoquinolinium (TCNQ)2 salt + ionic liquid) system, influence of amount of ionic liquid added

| | Ionic liquid added | | Initial properties | | | |
|---|---|---|---|---|---|---|
| | Ionic liquid | Adding amount (%) | Capacitance (μF) | tanδ (%) | Impedance (mΩ) | Withstand voltage (V) |
| Example 160 | ILS-1 | 0.01 | 6.7 | 2.1 | 97 | 20 |
| Example 161 | | 0.1 | 6.8 | 2.2 | 97 | 24 |
| Example 103 | | 2 | 6.6 | 2.2 | 98 | 28 |
| Example 162 | | 10 | 6.4 | 2.5 | 146 | 30 |
| Example 105 | | 20 | 5.3 | 3.9 | 240 | 36 |
| Example 106 | | 50 | 4.8 | 5.8 | >500 | 38 |
| Example 107 | ILS-10 | 0.01 | 6.7 | 2.1 | 95 | 24 |
| Example 108 | | 0.1 | 6.6 | 2.2 | 94 | 32 |
| Example 78 | | 2 | 6.9 | 2.1 | 92 | 44 |
| Example 110 | | 10 | 6.2 | 2.8 | 230 | 46 |
| Example 111 | | 20 | 5.7 | 3.4 | 470 | 48 |

TABLE 20-continued

Initial properties of capacitor: aluminum/oxide
film/(N-n-butylisoquinolinium (TCNQ)2 salt + ionic liquid)
system, influence of amount of ionic liquid added

| | Ionic liquid added | | Initial properties | | | |
|---|---|---|---|---|---|---|
| | Ionic liquid | Adding amount (%) | Capacitance (μF) | tanδ (%) | Impedance (mΩ) | Withstand voltage (V) |
| Example 112 | | 50 | 4.2 | 5.4 | >500 | >50 |
| Comparative Example 13 | No | | 6.9 | 2.1 | 82 | 18 |

The results indicate that even when the amount of the ionic liquid added to a TCNQ salt is 0.01 part by weight relative to 100 parts by weight of the TCNQ salt, there is the effect of improving the withstand voltage, and the effect is significant with the ionic liquid added in an amount of 0.1 part by weight or more. However, when the amount is 10 parts by weight or more, the impedance property is degraded, and the capacitance also tends to be decreased.

These results reveal that in an electrolyte including a TCNQ salt and an ionic liquid, the amount of the ionic liquid added is most preferably in a range of 0.01% to less than 10% relative to 100% by weight of the TCNQ salt.

INDUSTRIAL APPLICABILITY

By using the method of the present invention, an oxide film can be easily formed on a valve metal. Furthermore, when the method of the present invention is used for an electrolyte of an electrolytic capacitor, a high-performance electrolytic capacitor having excellent high-frequency characteristics and a high withstand voltage can be obtained on the basis of the nonvolatility and excellent oxide film repairing ability of an ionic liquid contained in the electrolyte.

The invention claimed is:

1. A solid electrolytic capacitor comprising:
a positive electrode of a valve metal,
a dielectric of an anodized film formed on said valve metal, and
a negative electrode comprising a composite material in contact with said anodized film,
wherein said composite material comprises a conductive polymer and an ionic liquid capable of repairing a defect in said anodized film.

2. The solid electrolytic capacitor according to claim 1, wherein said conductive polymer comprises at least one selected from the group consisting of polypyrrole, polyaniline, polythiophene, and derivatives thereof.

3. The solid electrolytic capacitor according to claim 1, wherein said negative electrode further comprises a metallic part in contact with said composite material.

4. A method of forming the solid electrolytic capacitor of claim 1 comprising the steps of:
preparing a mixture including said ionic liquid and at least one kind of monomer,
placing said mixture so as to contact with said anodized film and
polymerizing said mixture so that said at least one kind of monomer converts into said conductive polymer.

5. The method according to claim 4, wherein said ionic liquid having been included in said mixture is remained in said composite material after said polymerization.

6. A method of forming the solid electrolytic capacitor of claim 1 comprising the steps of:
preparing a layer of said conductive polymer, and
impregnating said layer of said conductive polymer with said ionic liquid.

7. A source material kit for forming said composite material to be used in the solid electrolytic capacitor of claim 1 comprising the ionic liquid and at least one kind of monomer.

8. The source material kit according to claim 7, wherein said monomer is at least one selected from the group consisting of polypyrrole, polyaniline, polythiophene, and derivatives thereof.

9. The solid electrolytic capacitor according to claim 1, wherein said valve metal is at least one selected from the group consisting of aluminum, tantalum, niobium, and an alloy thereof.

10. A method of improving a withstand voltage of a solid electrolytic capacitor that comprises:
a positive electrode of a valve metal,
a dielectric of an anodized film formed on the valve metal, and
a negative electrode comprising a composite material in contact with the anodized film,
wherein the composite material comprises a conductive polymer and an ionic liquid,
the method comprising a step of:
repairing a defect of the anodized film formed on the valve material of the positive electrode with the ionic liquid.

* * * * *